United States Patent
Eguchi et al.

(10) Patent No.: US 8,699,146 B2
(45) Date of Patent: Apr. 15, 2014

(54) ZOOM LENS SYSTEM

(75) Inventors: Masaru Eguchi, Saitama (JP); Koichiro Hayakawa, Saitama (JP)

(73) Assignee: Hoya Corporation, Tokyo (JP)

(*) Notice: Subject to any disclaimer, the term of this patent is extended or adjusted under 35 U.S.C. 154(b) by 0 days.

(21) Appl. No.: 13/435,279

(22) Filed: Mar. 30, 2012

(65) Prior Publication Data
US 2012/0262800 A1 Oct. 18, 2012

(30) Foreign Application Priority Data
Apr. 13, 2011 (JP) ................................. 2011-089042

(51) Int. Cl.
 *G02B 15/14* (2006.01)
 *G02B 3/02* (2006.01)
 *G02B 15/173* (2006.01)
(52) U.S. Cl.
 CPC .................................. *G02B 15/173* (2013.01)
 USPC ........................................ 359/687; 359/715
(58) Field of Classification Search
 USPC ............... 359/715, 687, 676, 683, 686
 See application file for complete search history.

(56) References Cited

U.S. PATENT DOCUMENTS

| | | | |
|---|---|---|---|
| 2005/0243437 A1 | 11/2005 | Hozumi et al. | |
| 2006/0262422 A1 | 11/2006 | Ohashi | |
| 2008/0100923 A1 | 5/2008 | Morooka | |
| 2011/0222169 A1* | 9/2011 | Sudoh | ........................ 359/687 |
| 2012/0050864 A1 | 3/2012 | Eguchi | |

FOREIGN PATENT DOCUMENTS

| | | |
|---|---|---|
| JP | 2006-023529 | 1/2006 |
| JP | 2006-308957 | 11/2006 |
| JP | 2008-112013 | 5/2008 |

* cited by examiner

*Primary Examiner* — Jack Dinh
(74) *Attorney, Agent, or Firm* — Greenblum & Bernstein, P.L.C.

(57) ABSTRACT

A zoom lens system includes a positive first lens group, a negative second lens group, a positive third lens group and a positive fourth lens group, in that order from the object side. Upon zooming from the short to long focal length extremities, the distance between the first and second lens groups increases, the distance between the second and third lens groups decreases, and the distance between the third and fourth lens groups changes. The second lens group includes a negative lens element having a concave surface on the image side, a negative lens element having a concave surface on the image side, and a plastic positive lens element having an aspherical surface on at least one side and having a convex surface on the object side, in that order from the object side.

6 Claims, 25 Drawing Sheets

ZOOM LENS SYSTEM

BACKGROUND OF THE INVENTION

1. Field of the Invention

The present invention relates to a zoom lens system that is suitable mainly for use as an imaging optical system for an image sensor, and includes a wide angle range of a half angle-of-view of 35 degrees.

2. Description of Related Art

In recent years there has been an increasing need for zoom lens systems in compact cameras to achieve a wider angle-of-view and a high zoom ratio. Whereas, further advancement in the miniaturization of the pixel pitch has occurred, thereby increasing the demand for the optical system to have a higher resolution. It is very common for photographing lens systems which are mainly used for compact cameras to achieve a slimmer camera body by employing a retractable mechanism that uses multi-stage barrels to reduce the air-distance between lens groups when the zoom lens system is fully retracted to the accommodation position. A zoom lens system that is suitable for such a retractable mechanism is required to have thin lens groups (small in the optical axis direction) as well as the frontmost lens group having a small lens diameter. Furthermore, at the design stage, consideration needs to be given to mechanical restrictions in regard to the overall length of the zoom lens system.

Zoom lens systems configured of a positive first lens group, a negative second lens group, a positive third lens group, and a positive fourth lens group, in that order from the object side, i.e., four lens groups, are known to be used for compact cameras (Japanese Unexamined Patent Publication Nos. 2006-23529, 2006-308957 and 2008-112013).

However, in the zoom lens system taught in Japanese Unexamined Patent Publication No. 2006-23529, the zoom ratio is approximately 5:1, and the angle-of-view at the short focal length extremity is only 61 degrees, and hence, does not achieve a sufficiently wide angle-of-view nor a sufficiently high zoom ratio.

Furthermore, in the zoom lens system taught in Japanese Unexamined Patent Publication No. 2006-308957, the angle-of-view at the short focal length extremity is approximately 78 degrees, achieving a wide angle-of-view; however, the zoom ratio is within a range of approximately 4:1 through 7:1, which are not satisfactory valves.

Furthermore, the zoom lens system taught in Japanese Unexamined Patent Publication No. 2008-112013, large amounts of astigmatism and chromatic aberration occur, and such aberration levels are unsatisfactory for a zoom lens system that is compatible with high pixelization.

SUMMARY OF THE INVENTION

The present invention provides a zoom lens system configured of a positive lens group, a negative lens group, a positive lens group and a positive lens group, in that order from the object side, having a zoom ratio of approximately 10:1, having an angle-of-view of at least 70 degrees at the short focal length extremity, the frontmost lens group having a small diameter, the overall length of the zoom lens system being reduced at the short focal length extremity, being suitable for a retractable-barrel camera, and having a superior optical quality.

According to an aspect of the present invention, a zoom lens system is provided, including a positive first lens group, a negative second lens group, a positive third lens group and a positive fourth lens group, in that order from the object side, wherein upon zooming from the short focal length extremity to the long focal length extremity, the distance between the first lens group and the second lens group increases, the distance between the second lens group and the third lens group decreases, and the distance between the third lens group and the fourth lens group changes. The second lens group includes a negative lens element having a concave surface on the image side, a negative lens element having a concave surface on the image side, and a plastic positive lens element having an aspherical surface on at least one side thereof and having a convex surface on the object side, in that order from the object side.

It is desirable for the third lens group to include a biconvex positive lens element having an aspherical surface on at least one side thereof, and a plastic negative meniscus lens element having a concave surface on the image side, in that order from the object side.

It is desirable for the following condition (1) to be satisfied:

$$-1.2 < fa/fb < -0.8 \quad (1),$$

wherein fa designates the focal length of the plastic positive lens element that is provided within the second lens group; and fb designates the focal length of the plastic negative meniscus lens element provided within the third lens group.

It is desirable for the following condition (2) to be satisfied:

$$-7 < f1/f2 < -5.5 \quad (2),$$

wherein f1 designates the focal length of the first lens group, and f2 designates the focal length of the second lens group.

It is desirable for the following condition (3) to be satisfied:

$$0.2 < f3/f4 < 0.5 \quad (3),$$

wherein f3 designates the focal length of the third lens group, and f4 designates the focal length of the fourth lens group.

It is desirable for the following condition (4) to be satisfied:

$$1.0 < z2/z3 < 1.8 \quad (4),$$

wherein z2=m2t/m2w; z3=m3t/m3w; m2t designates the lateral magnification of the second lens group when focused on an object at infinity at the long focal length extremity; m2w designates the lateral magnification of the second lens group when focused on an object at infinity at the short focal length extremity; m3t designates the lateral magnification of the third lens group when focused on an object at infinity at the long focal length extremity; and m3w designates the lateral magnification of the third lens group when focused on an object at infinity at the short focal length extremity.

It is desirable for the third lens group to include a positive lens element having an aspherical surface on each side thereof, and a negative lens element having an aspherical surface on at least one side thereof and having a concave surface on the image side, in that order from the object side, wherein the following condition (5) is satisfied:

$$vd > 70 \quad (5),$$

wherein vd designates the Abbe number with respect to the d-line of the positive lens element provided in the third lens group.

According to the present invention, a zoom lens system is achieved which is configured of a positive lens group, a negative lens group, a positive lens group and a positive lens group, in that order from the object side, having a zoom ratio of approximately 10:1, having an angle-of-view of at least 70 degrees at the short focal length extremity, the frontmost lens group having a small diameter, the overall length of the zoom lens system being reduced at the short focal length extremity, being suitable for a retractable-barrel camera, and having a superior optical quality.

The present disclosure relates to subject matter contained in Japanese Patent Application No. 2011-89042 (filed on Apr. 13, 2011) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

Figure 25:
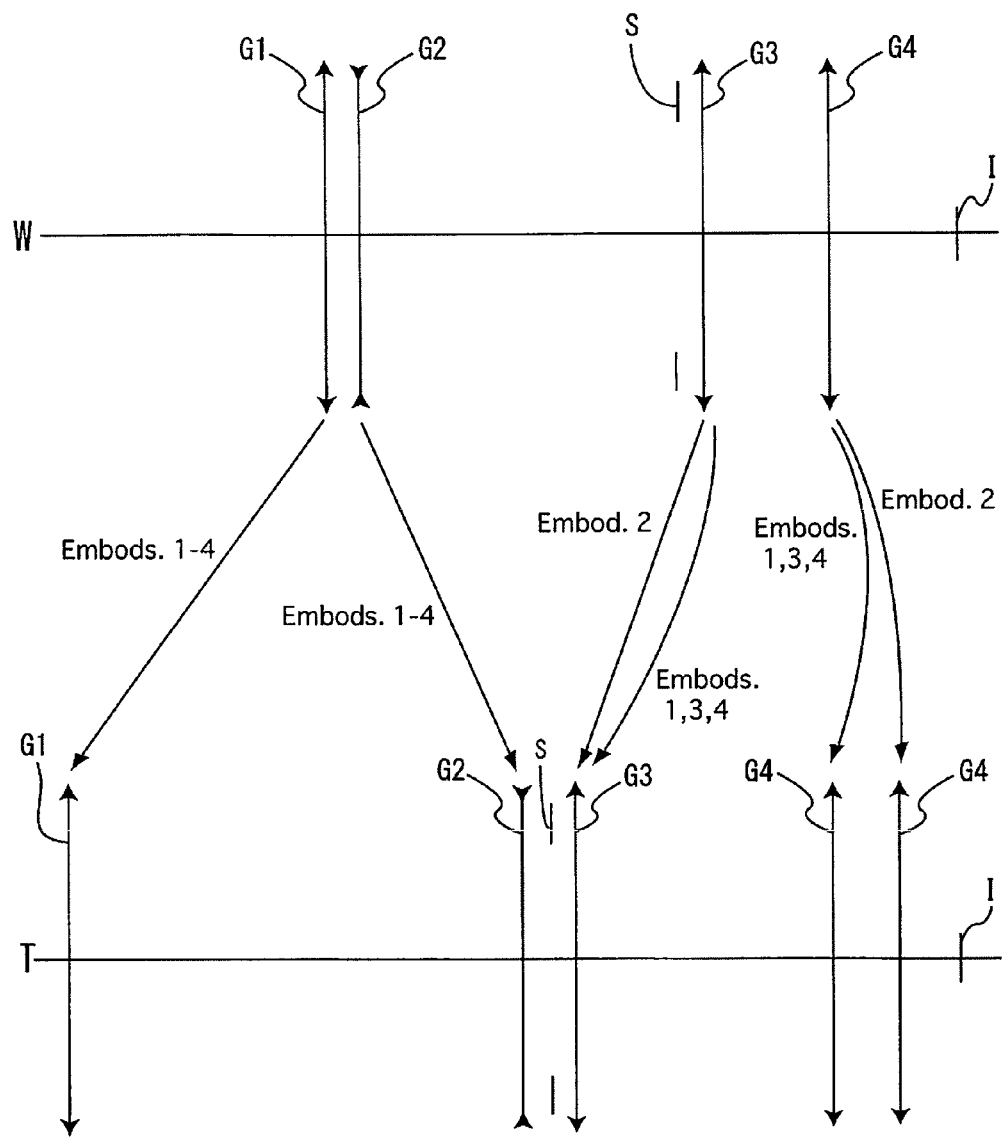
FIG. 25 shows a zoom path of the zoom lens system according to the present invention.

The zoom lens system according to the present invention, as shown in the zoom path of FIG. 25, is configured of a positive first lens group G1, a negative second lens group G2, a positive third lens group G3, and a positive fourth lens group G4, in that order from the object side. A diaphragm S, which is provided in between the second lens group G2 and the third lens group G3, integrally moves with the third lens group G3. Focusing operations are carried out by the fourth lens group G4. "I" designates the imaging plane.

Upon zooming from the short focal length extremity (W) to the long focal length extremity (T), at least the first through third lens groups G1 through G3 move along the optical axis direction while the distance between the first lens group G1 and the second lens group G2 increases, the distance between the second lens group G2 and the third lens group G3 decreases, and the distance between the third lens group G3 and the fourth lens group G4 increases.

More specifically, according to the following embodiments, upon zooming from the short focal length extremity (W) to the long focal length extremity (T), the first through fourth lens groups G1 through G4 move along the optical axis direction in the following manner. Namely, in each of the first through fourth numerical embodiments, the first lens group G1 moves monotonically toward the object side. In each of the first through fourth numerical embodiments, the second lens group G2 moves monotonically toward the image side. In the first, third and fourth numerical embodiments, the third lens group G3 moves monotonically toward the object side while plotting a convex path toward the image side. In the second numerical embodiment, the third lens group G3 monotonically moves toward the object side. In the first, third and fourth numerical embodiments, the fourth lens group G4 first moves toward the image side and thereafter "U-turns" back toward the object side to return to the short focal length extremity position thereof or in the close vicinity thereof. In the second numerical embodiment, the fourth lens group G4 monotonically moves toward the image side while plotting a convex path toward the image side.

In the each of the first through fourth numerical embodiments, the first lens group G1 is configured of a negative lens element 11 and a positive lens element 12, in that order from the object side.

In each of the first through fourth numerical embodiments, the second lens group G2 is configured of a negative lens element (negative lens element having a concave surface on the image side) 21, a negative lens element (negative lens element having a concave surface on the image side) 22, and a plastic positive lens element (plastic positive lens element having a convex surface on the object side) 23, in that order from the object side. The plastic positive lens element 23 has an aspherical surface on each side thereof. Alternatively, it is acceptable for the plastic positive lens element 23 to have an aspherical surface only on one side thereof.

In each of the first through fourth numerical embodiments, the third lens group G3 is configured of a positive lens element (biconvex positive lens element) 31, and a plastic negative lens element (plastic negative meniscus lens element having a concave surface on the image side) 32, in that order from the object side. Each of the positive lens element 31 and the plastic negative lens element has an aspherical surface on each side thereof. Alternatively, it is acceptable for each of the positive lens element 31 and the plastic negative lens element 32 to have an aspherical surface only on one side thereof.

In the first, third and fourth numerical embodiments, the fourth lens group G4 is configured of a positive single lens element 41. The positive single lens element 41 has an aspherical surface on each side thereof.

In the second numerical embodiment, the fourth lens group G4 is configured of a positive lens element 41 and a negative lens element 42, in that order from the object side. The positive lens element 41 has an aspherical surface on each side thereof. The negative lens element 42 has an aspherical surface on the object side thereof.

In order to miniaturize a camera body in which a retractable zoom lens system is installed that uses multi-stage barrels, it is important to reduce the diameter of the first lens group (G1) that is positioned closest to the object side and to reduce the overall length of the zoom lens system. The thickness (in the optical axis direction) of each lens group is required to be small. It is also necessary to simplify the mechanical structure for moving the lens groups during a zooming operation. Generally, the fewer number of lens groups in a zoom lens system, the simpler the mechanical structure, however, such an arrangement makes it difficult to achieve a higher zoom ratio. Furthermore, reducing the number of lens elements in each lens group in order to miniaturize the zoom lens system and to reduce the thickness of each lens group leads to an increased difficulty in correcting aberrations. In order to favorably correct various aberrations over the entire zooming range while achieving a miniaturized zoom lens system, an appropriate refractive power distribution over each lens group and an appropriate lens arrangement are necessary.

The zoom lens system according to the present embodiments is a positive-lead lens system configured of a positive lens group, a negative lens group, a positive lens group and a positive lens group, in that order from the object side, and has the advantage of being able to achieve a higher zoom ratio compared to negative-lead zoom lens systems which are often used in compact cameras. However, since the number of lens elements used in the lens groups increases, a problem occurs with the lens groups having an increased thickness (length in the optical axis direction) when fully retracted to the accommodated position. Furthermore, since the frontmost lens diameter easily increases, if a multi-stage barrel configuration is utilized to retract and accommodate the lens groups, the multi-stage barrel is also increased in size in the radial direction, to the extent that the enlarged multi-stage barrel cannot be utilized in a compact camera. Furthermore, even in a positive-lead zoom lens system, if attempts are made to achieve a higher zoom ratio, the overall length of the zoom lens system increases at the long focal length extremity. In order to prevent an increased overall length of the zoom lens system, it is necessary to appropriately set the refractive powers of the second lens group G2 and the third lens group G3. Furthermore, both a higher zoom ratio and further miniaturization (compactness) are also desired while reducing the number of lens elements of the second lens group G2 and the third lens group G3 in order to prevent an increase in the thickness (the length in the optical axis direction) of each of the second lens group G2 and the third lens group G3 when the zoom lens system is fully retracted at the accommodated state.

Conventionally, a zoom lens system in which the second lens group is configured of two negative lens elements and one positive lens element, i.e., three lens elements, is known in the art. However, if attempts are made to achieve both a higher zoom ratio and further miniaturization (compactness), since it becomes necessary to strengthen the negative refractive power of the second lens group, chromatic aberration and various abaxial aberrations within the second lens group cannot be sufficiently corrected, so that the imaging quality deteriorates.

To solve this problem, in the zoom lens system of the present embodiments, the second lens group G2 is configured of a negative lens element 21 having a concave surface on the image side, a negative lens element 22 having a concave surface on the image side, and a plastic positive lens element 23 having a convex surface on the object side and an aspherical surface on at least one side, in that order from the object side, thereby favorably correcting chromatic aberration and various abaxial aberrations within the second lens group G2 so that a superior imaging quality is achieved.

Furthermore, in the zoom lens system of the present embodiments, the third lens group G3 is configured of a biconvex positive lens element 31 having an aspherical surface on at least one side, and a plastic negative meniscus lens element 32 having a concave surface on the image side, in that order from the object side. By configuring the third lens group G3 in this manner, occurrence of aberrations within the third lens group G3 can be reduced, and any axial focal shift or change in abaxial field curvature that occur in the plastic positive lens element 23 of the second lens group G2 and in the plastic negative meniscus lens element 32 of the third lens group G3, due to a change in temperature, can be reduced.

Condition (1) specifies the ratio of the focal length of the plastic positive lens element 23 of the second lens group G2 to the focal length of the plastic negative meniscus lens element 32 of the third lens group G3. By satisfying condition (1), any adverse influence of a change in temperature to a high temperature or to a low temperature can be reduced, to thereby achieve a superior imaging quality.

If the upper or lower limits of condition (1) are exceeded, the mutual cancellation of the various aberrations, which occur upon a change in temperature, by the plastic positive lens element 23 and the plastic negative meniscus lens element 32 decreases, so that the imaging quality deteriorates due to the adverse influence of a change in temperature to a high temperature or to a low temperature.

Condition (2) specifies the ratio of the focal length of the first lens group G1 to the focal length of the second lens group G2. By satisfying condition (2), a wide angle-of-view of at least 70 degrees can be achieved, while preventing an increase in diameter of the first lens group G1 at the short focal length extremity, and also reducing the overall length of the zoom lens system at the long focal length extremity.

If the upper limit of condition (2) is exceeded, the refractive power of the second lens group G2 becomes too weak with respect to the refractive power of the first lens group G1, which although is advantageous for shortening the overall length of the zoom lens system at the long focal length extremity, it becomes difficult to achieve a wide angle-of-view of at least 70 degrees.

If the lower limit of condition (2) is exceeded, the refractive power of the second lens group G2 becomes too strong with respect to the refractive power of the first lens group G1, the diameter of the first lens group G1 increases, and the overall length of the zoom lens system at the long focal length extremity increases. If, in a state where the lower limit of condition (2) is exceeded, the refractive power of each of the first through fourth lens groups G1 through G4 is strengthened to reduce the amount of movement of each lens group during zooming, in order to reduce the overall length of the zoom lens system, it becomes difficult to correct aberrations throughout the entire zooming range.

Condition (3) specifies the ratio of the focal length of the third lens group G3 to the focal length of the fourth lens group G4. By satisfying condition (3), an appropriate balance is achieved between the refractive power of the third lens group G3 which mainly carries out the zooming operation and the refractive power of the fourth lens group G4 which mainly achieves telecentricity of the zoom lens system and carries out the focusing operation, so that the zoom lens system can be further miniaturized.

If the upper limit of condition (3) is exceeded, the refractive power of the fourth lens group G4 becomes too strong with respect to the refractive power of the third lens group G3, so that aberrations increase when focused at a close object distance.

If the lower limit of condition (3) is exceeded, the refractive power of the third lens group G3 becomes too strong with respect to the refractive power of the fourth lens group G4, so that since it becomes difficult to correct aberrations occurring in the third lens group G3, it becomes necessary to increase the number of lens elements in the third lens group G3, thereby increasing the overall size of the zoom lens system (in the optical axis direction).

Condition (4) specifies the ratio of zooming burden of the second lens group G2 to the zooming burden of the third lens group G3. By satisfying condition (4), the effective diameter of first lens group G1 can be reduced while suppressing fluctuation of the f-number.

If the upper limit of condition (4) is exceeded, the zooming burden of the second lens group G2 with respect to the zooming burden of the third lens group G3 increases excessively, so that since the refractive power of the second lens group G2 becomes too strong, the effective diameter of the first lens group G1 increases.

If the lower limit of condition (4) is exceeded, the zooming burden of the third lens group G3 with respect to the zooming burden of the second lens group G2 increases excessively, so that the amount of movement of the third lens group G3 during zooming increases and the fluctuation in the f-number also increases.

As described above, in each of the first through fourth numerical embodiments, the third lens group G3 is configured of a positive lens element 31 having an aspherical surface on each side, and a negative lens element 32 having an aspherical surface on at least one side thereof and a concave surface on the image side, in that order from the object side. The negative lens element 32 is not limited to a plastic lens element, but can also be configured of a glass lens element.

With the above-described configuration, condition (5) specifies the Abbe number with respect to the d-line of the positive lens element 31 which is provided within the third lens group G3. By satisfying condition (5), chromatic aberrations within the third lens group G3 can be favorably corrected.

If the lower limit of condition (5) is exceeded, it becomes difficult to correct chromatic aberration in the third lens group G3.

Specific numerical embodiments will be herein discussed. In the aberration diagrams and the tables, the d-line, g-line and C-line show aberrations at their respective wave-lengths; S designates the sagittal image, M designates the meridional image, Fno. designates the f-number, f designates the focal length of the entire optical system, W designates the half angle of view)(°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$X=cy^2/(1+[1-\{1+K\}c^2y^2]^{1/2})+A4y^4+A6y^6+A8y^8+A10y^{10}+A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 1:
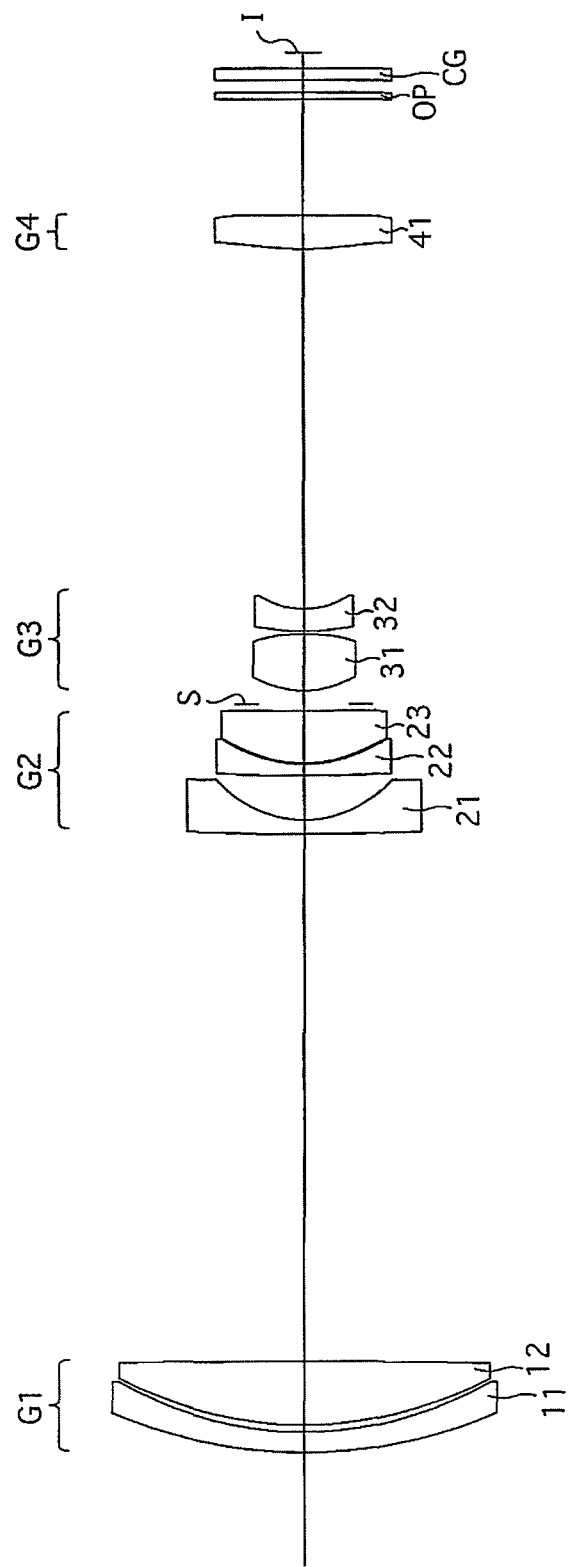
FIG. 1 shows a lens arrangement of a first numerical embodiment of a zoom lens system, according to the present invention, at the long focal length extremity when focused on an object at infinity.
Figure 2:
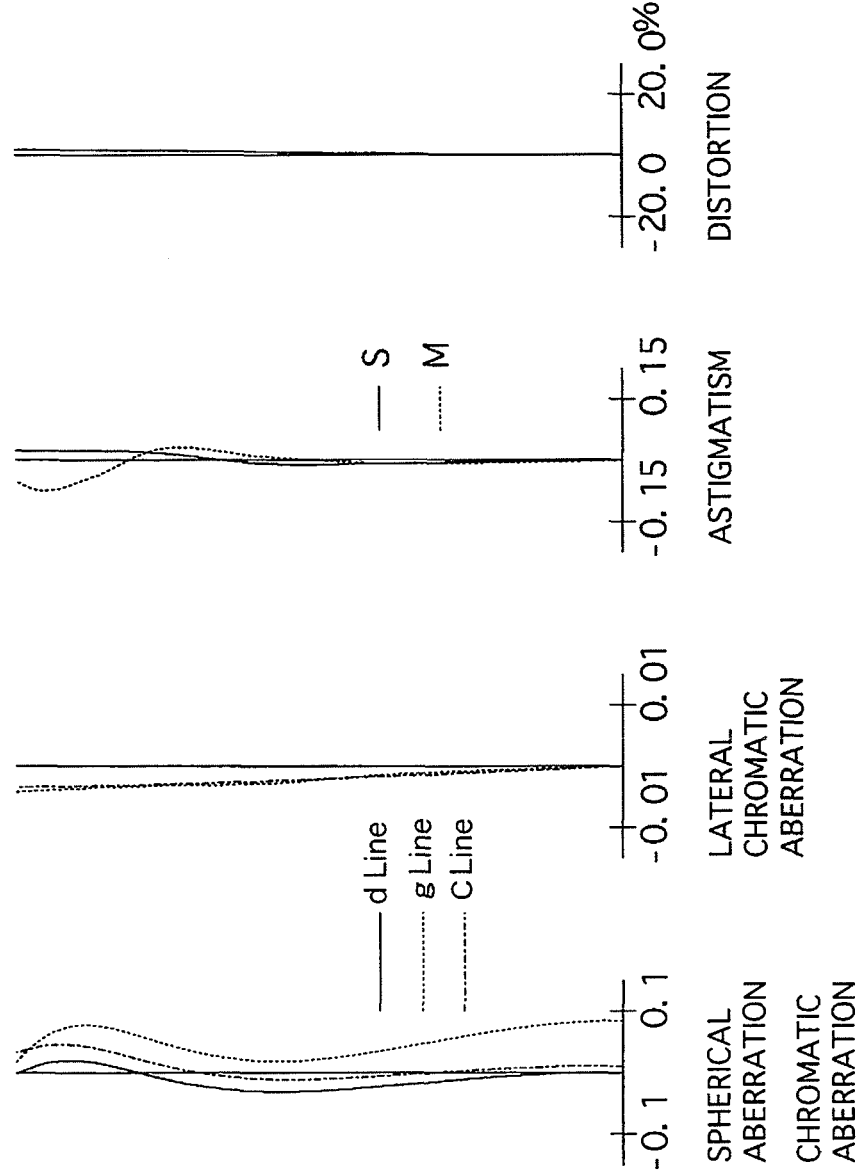
FIGS. 2A, 2B, 2C and 2D show various aberrations that occurred in the lens arrangement shown in FIG. 1.
Figure 3:
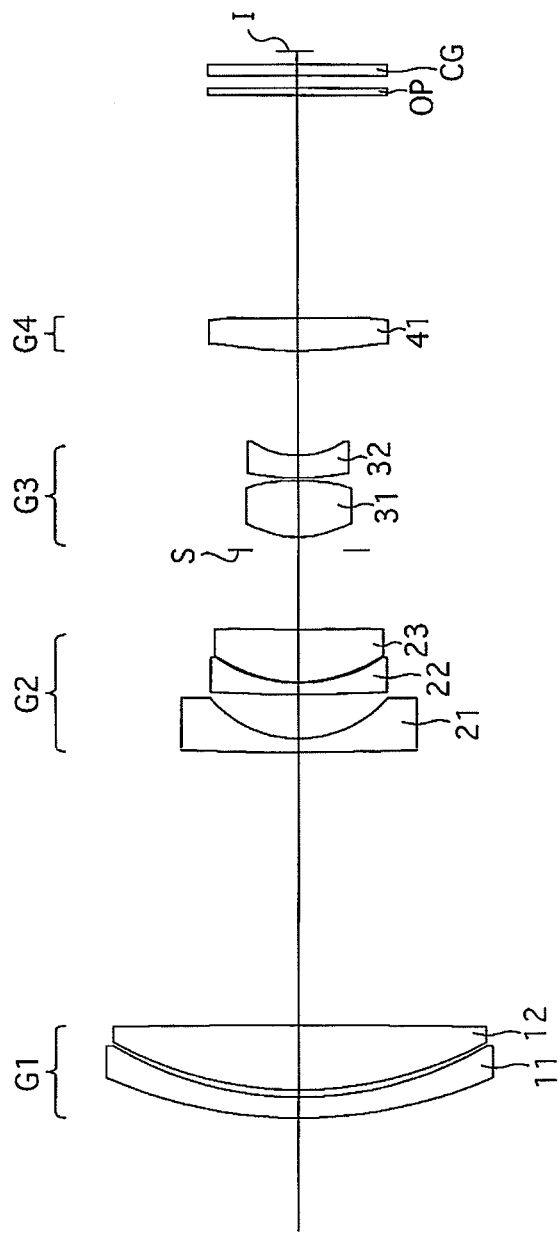
FIG. 3 shows a lens arrangement of the first numerical embodiment of the zoom lens system, according to the present invention, at an intermediate focal length when focused on an object at infinity.
Figure 4:
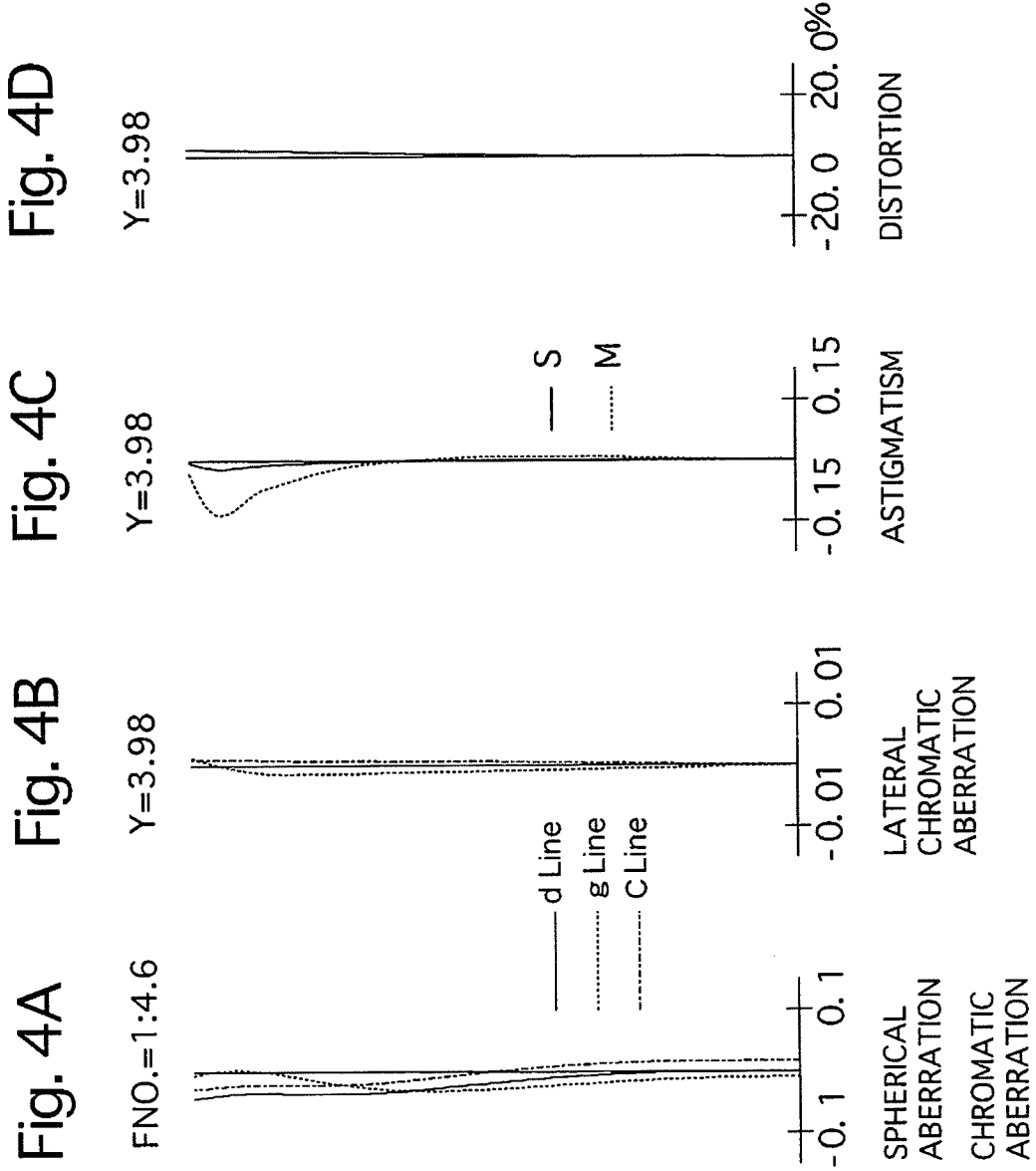
FIGS. 4A, 4B, 4C and 4D show various aberrations that occurred in the lens arrangement shown in FIG. 3.
Figure 5:
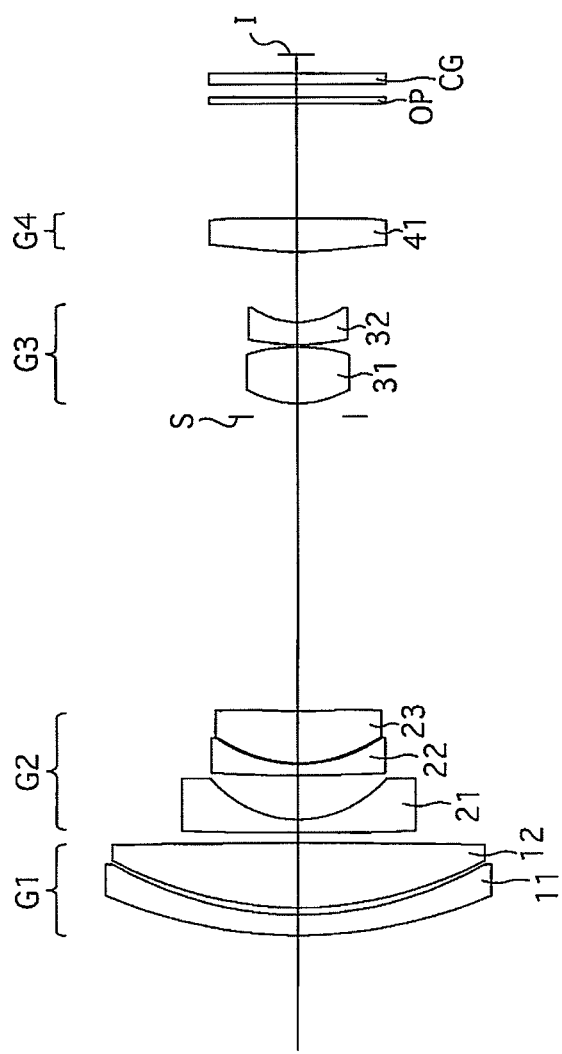
FIG. 5 shows a lens arrangement of the first numerical embodiment of the zoom lens system, according to the present invention, at the short focal length extremity when focused on an object at infinity.
Figure 6:
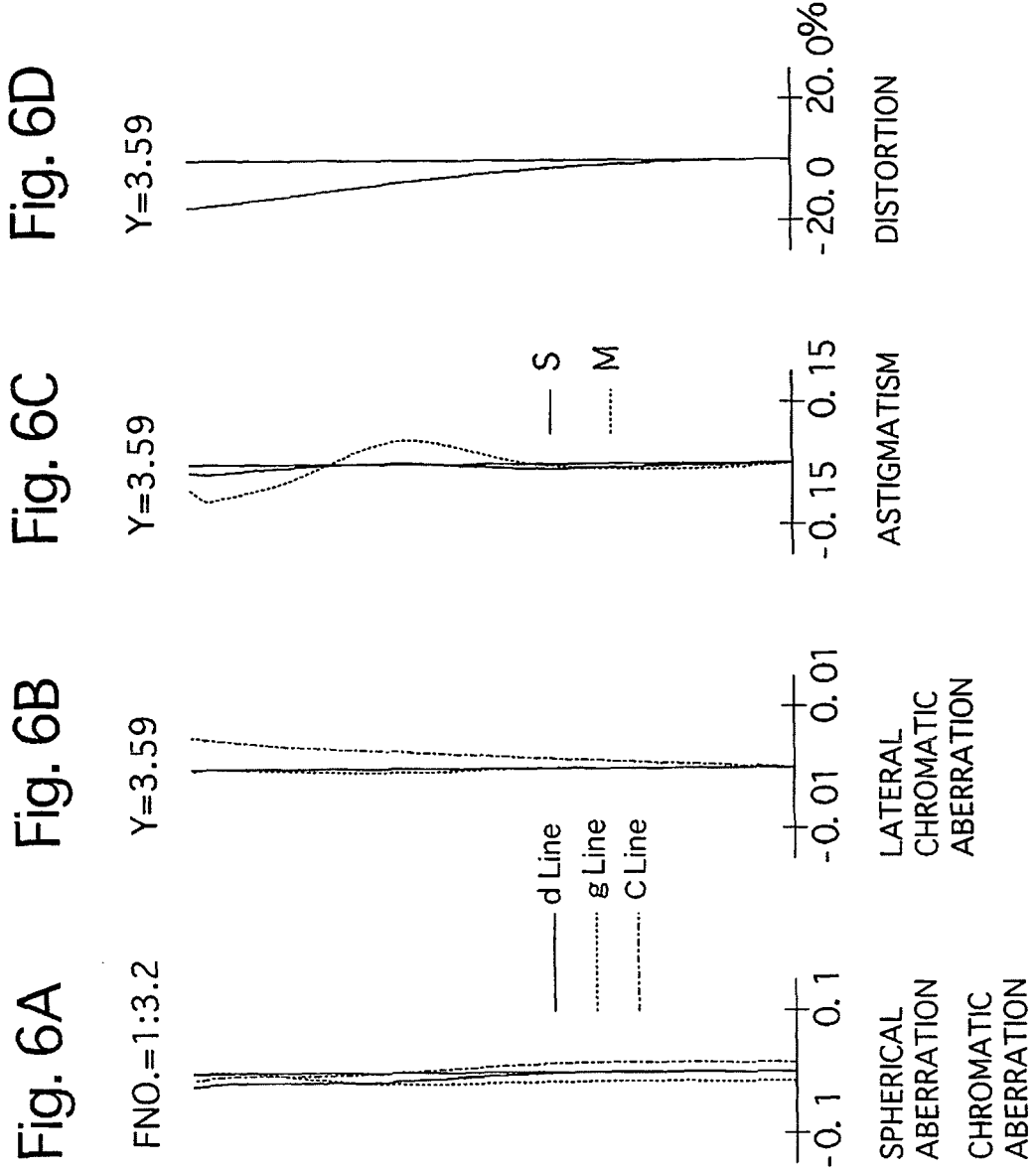
FIGS. 6A, 6B, 6C and 6D show various aberrations that occurred in the lens arrangement shown in FIG. 5.

FIGS. 1 through 6D and Tables 1 through 4 show a first numerical embodiment of a zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIG. 3 shows a lens arrangement of the first numerical embodiment of the zoom lens system at an intermediate focal length when focused on an object at infinity. FIGS. 4A, 4B, 4C and 4D show various aberrations that occurred in the lens arrangement shown in FIG. 3. FIG. 5 shows a lens arrangement of the first numerical embodiment of the zoom lens system at the short focal length extremity when focused on an object at infinity. FIGS. 6A, 6B, 6C and 6D show various aberrations that occurred in the lens arrangement shown in FIG. 5. Table 1 shows the lens surface data, Table 2 shows various zoom lens system data, Table 3 shows the aspherical surface data, and Table 4 shows the lens group data of the zoom lens system according to the first numerical embodiment.

The zoom lens system of the first numerical embodiment is configured of a positive first lens group G1, a negative second lens group G2, a positive third lens group G3 and a positive fourth lens group G4, in that order from the object side. The fourth lens group G4 constitutes a focusing lens group that is moved along the optical axis direction during a focusing operation (the fourth lens group G4 advances toward the object side when performing a focusing operation while focusing on an object at infinity to an object at a finite distance).

The first lens group G1 is configured of a negative meniscus lens element 11 having a convex surface on the object side, and a biconvex positive lens element 12, in that order from the object side.

The second lens group G2 is configured of a negative meniscus lens element 21 having a convex surface on the object side, a negative meniscus lens element 22 having a convex surface on the object side, and a plastic positive meniscus lens element 23 having a convex surface on the object side, in that order from the object side. The plastic positive meniscus lens element 23 is provided with an aspherical surface on each side thereof.

The third lens group G3 is configured of a biconvex positive lens element 31 and a plastic negative meniscus lens element 32 having a convex surface on the object side, in that order from the object side. Each of the biconvex positive lens element 31 and the plastic negative meniscus lens element 32 are provided with an aspherical surface on each side thereof. The diaphragm S that is provided in between the second lens group G2 and the third lens group G3 moves integrally with the third lens group G3 in the optical axis direction.

The fourth lens group G4 is configured of a positive meniscus lens element 41 having a convex surface on the object side. The positive meniscus lens element 41 has an aspherical surface on each side thereof. An optical filter OP and a cover glass CG are disposed behind (between the positive meniscus lens element 41 and the imaging plane I) the fourth lens group G4.

TABLE 1-continued

SURFACE DATA

| Surf. No. | r | d | Nd | vd |
|---|---|---|---|---|
| 13* | −9.307 | 0.100 | | |
| 14* | 9.150 | 1.000 | 1.60641 | 27.2 |
| 15* | 3.751 | d15 | | |
| 16* | 17.000 | 1.450 | 1.54358 | 55.7 |
| 17* | 77.613 | d17 | | |
| 18 | ∞ | 0.300 | 1.51680 | 64.2 |
| 19 | ∞ | 0.560 | | |
| 20 | ∞ | 0.500 | 1.51680 | 64.2 |
| 21 | ∞ | — | | |

The asterisk (*) designates an aspherical surface which is rotationally symmetrical with respect to the optical axis.

TABLE 2

ZOOM LENS SYSTEM DATA
Zoom Ratio 10.00

| | Short Focal Length Extremity | Intermediate Focal Length | Long Focal Length Extremity |
|---|---|---|---|
| FNO. | 3.2 | 4.6 | 6.0 |
| f | 4.68 | 16.00 | 46.76 |
| W | 42.3 | 13.6 | 4.8 |
| Y | 3.59 | 3.98 | 3.98 |
| fB | 0.59 | 0.59 | 0.59 |
| L | 38.60 | 46.99 | 61.50 |
| d4 | 0.450 | 12.008 | 23.205 |
| d10 | 12.921 | 3.482 | 0.305 |
| d15 | 3.100 | 4.607 | 15.856 |
| d17 | 5.071 | 9.840 | 5.072 |

TABLE 3

Aspherical Surface Data (the aspherical surface coefficients not indicated are zero (0.00)):

| Surf. No. | K | A4 | A6 | A8 | A10 |
|---|---|---|---|---|---|
| 9 | 0.000 | −0.2522E−03 | −0.1515E−04 | 0.7945E−06 | −0.9800E−07 |
| 10 | 0.000 | −0.5491E−03 | 0.1842E−04 | −0.2464E−05 | |
| 12 | −1.000 | −0.3178E−03 | 0.9672E−04 | −0.3627E−04 | |
| 13 | 0.000 | −0.1225E−03 | −0.4261E−03 | 0.1945E−04 | |
| 14 | 0.000 | 0.8374E−04 | −0.9096E−03 | 0.1042E−03 | |
| 15 | 0.000 | 0.1321E−02 | −0.7138E−03 | 0.1304E−03 | |
| 16 | 0.000 | −0.6743E−04 | −0.8734E−04 | 0.4743E−05 | −0.9597E−07 |
| 17 | 0.000 | −0.7972E−04 | −0.9460E−04 | 0.4587E−05 | −0.8287E−07 |

TABLE 1

SURFACE DATA

| Surf. No. | r | d | Nd | vd |
|---|---|---|---|---|
| 1 | 21.944 | 0.900 | 1.84666 | 23.8 |
| 2 | 16.417 | 0.320 | | |
| 3 | 17.549 | 2.847 | 1.61800 | 63.4 |
| 4 | −539.840 | d4 | | |
| 5 | 138.111 | 0.600 | 1.88300 | 40.8 |
| 6 | 5.256 | 1.940 | | |
| 7 | 67.086 | 0.500 | 1.59201 | 67.0 |
| 8 | 6.616 | 0.050 | | |
| 9* | 6.144 | 2.299 | 1.63550 | 23.6 |
| 10* | 47.063 | d10 | | |
| 11 (Diaphragm) | ∞ | 0.600 | | |
| 12* | 4.296 | 2.500 | 1.49700 | 81.6 |

TABLE 4

LENS GROUP DATA

| Lens Group | 1st Surf. | Focal Length |
|---|---|---|
| 1 | 1 | 42.10 |
| 2 | 5 | −6.65 |
| 3 | 12 | 9.56 |
| 4 | 16 | 39.71 |

Numerical Embodiment 2

Figure 7:
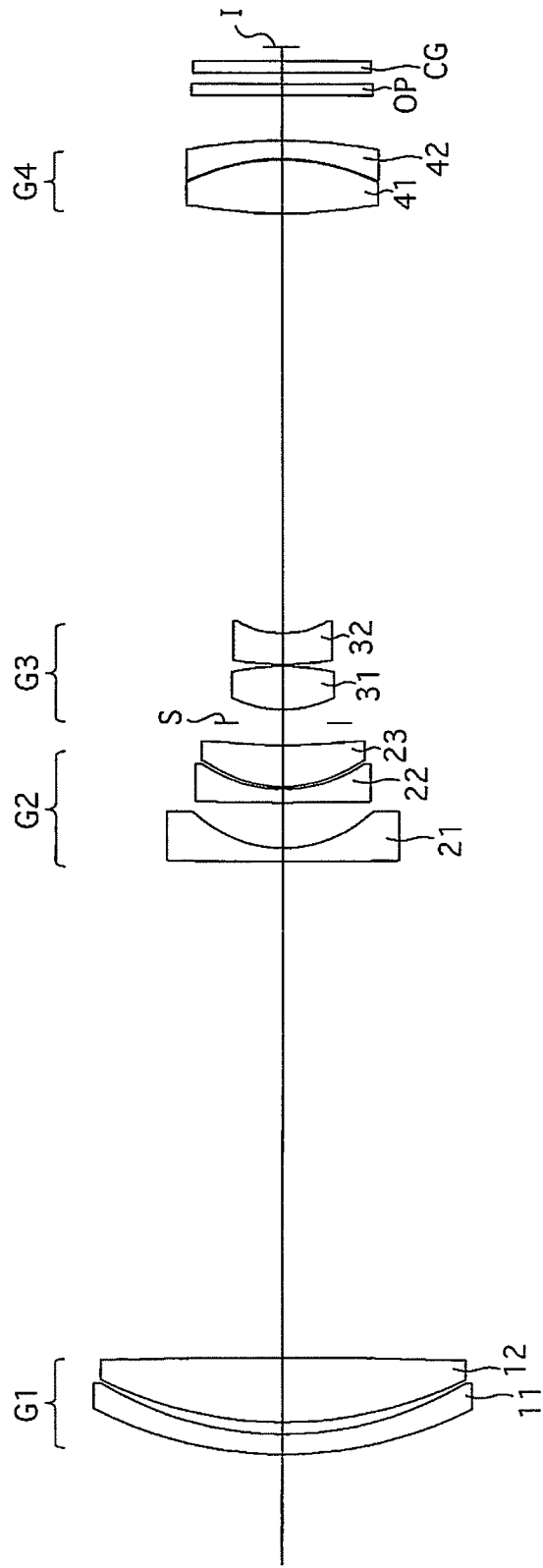
FIG. 7 shows a lens arrangement of a second numerical embodiment of a zoom lens system, according to the present invention, at the long focal length extremity when focused on an object at infinity.
Figure 8:
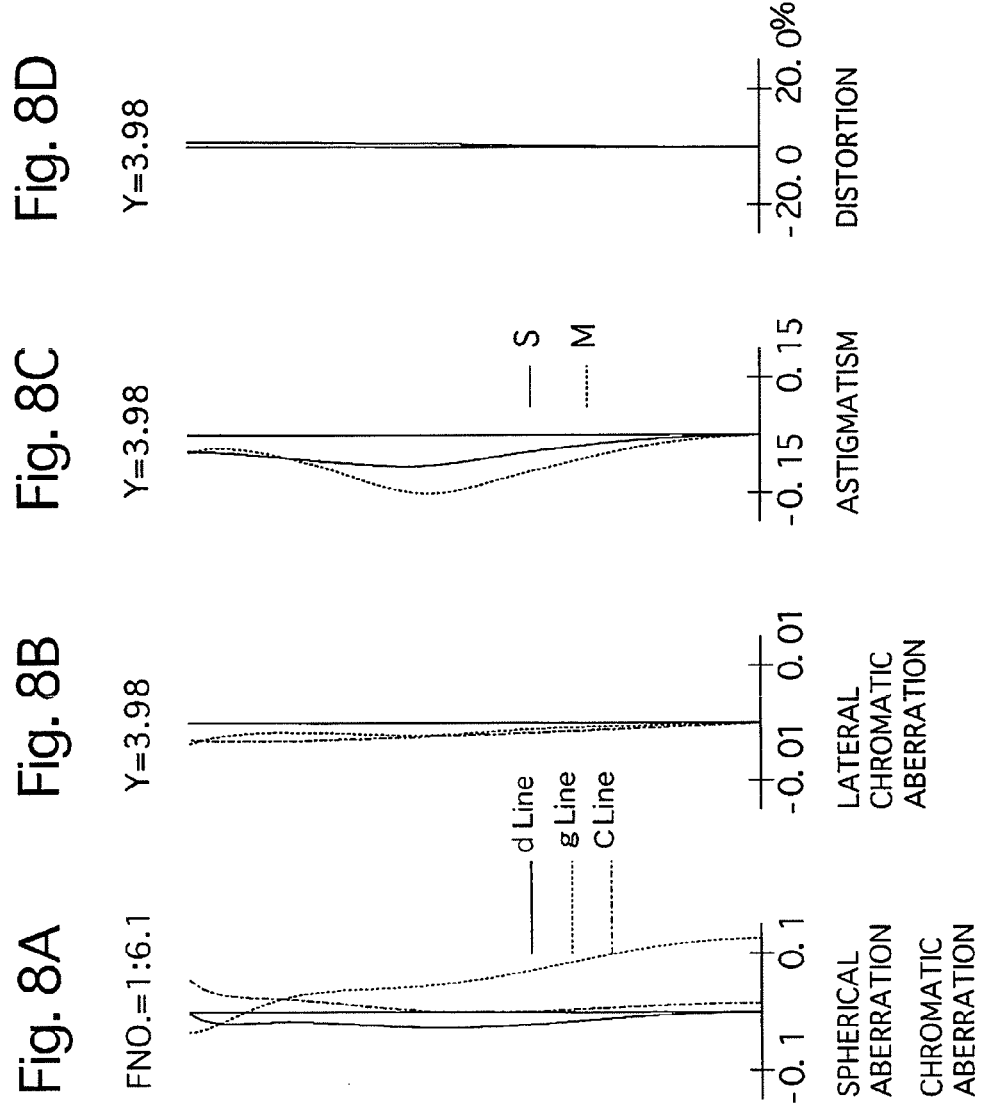
FIGS. 8A, 8B, 8C and 8D show various aberrations that occurred in the lens arrangement shown in FIG. 7.
Figure 9:
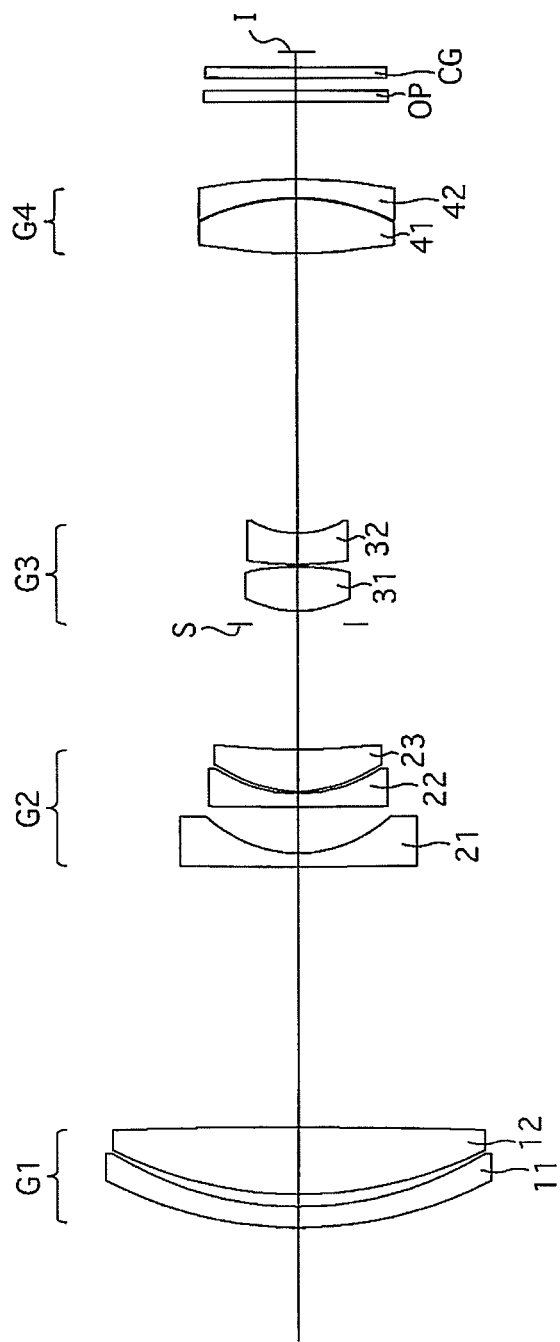
FIG. 9 shows a lens arrangement of the second numerical embodiment of the zoom lens system, according to the present invention, at an intermediate focal length when focused on an object at infinity.
Figure 10:
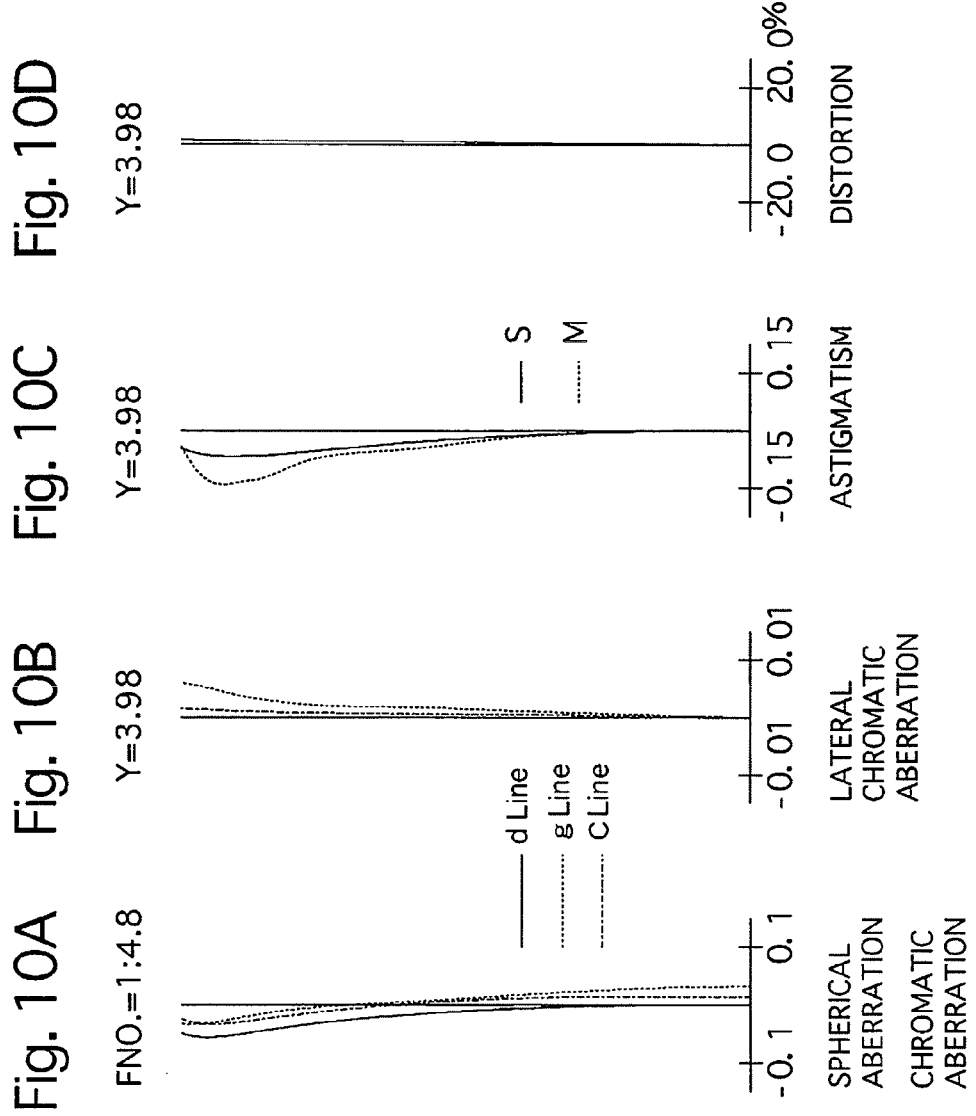
FIGS. 10A, 10B, 10C and 10D show various aberrations that occurred in the lens arrangement shown in FIG. 9.
Figure 11:
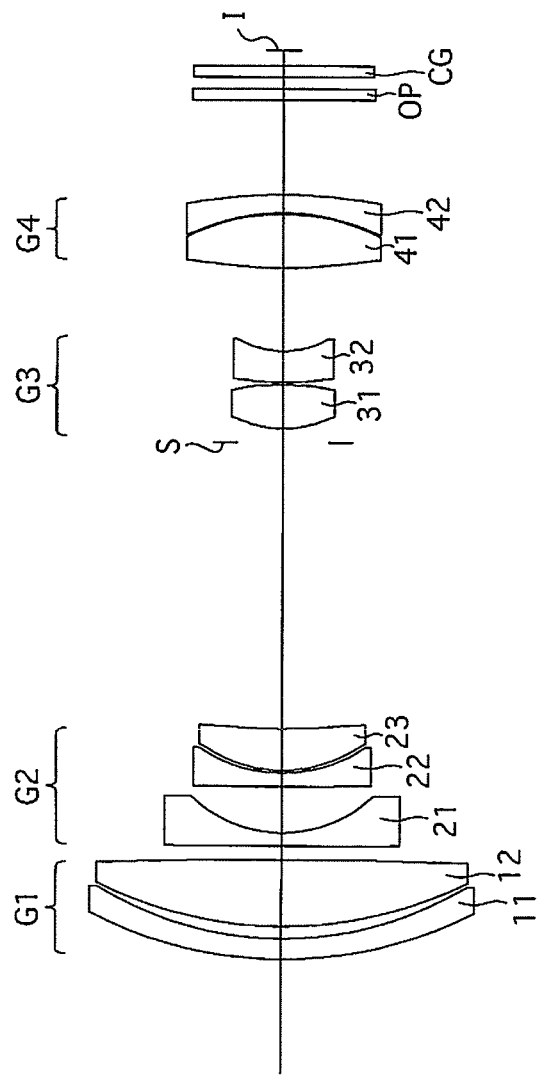
FIG. 11 shows a lens arrangement of the second numerical embodiment of the zoom lens system, according to the present invention, at the short focal length extremity when focused on an object at infinity.
Figure 12:
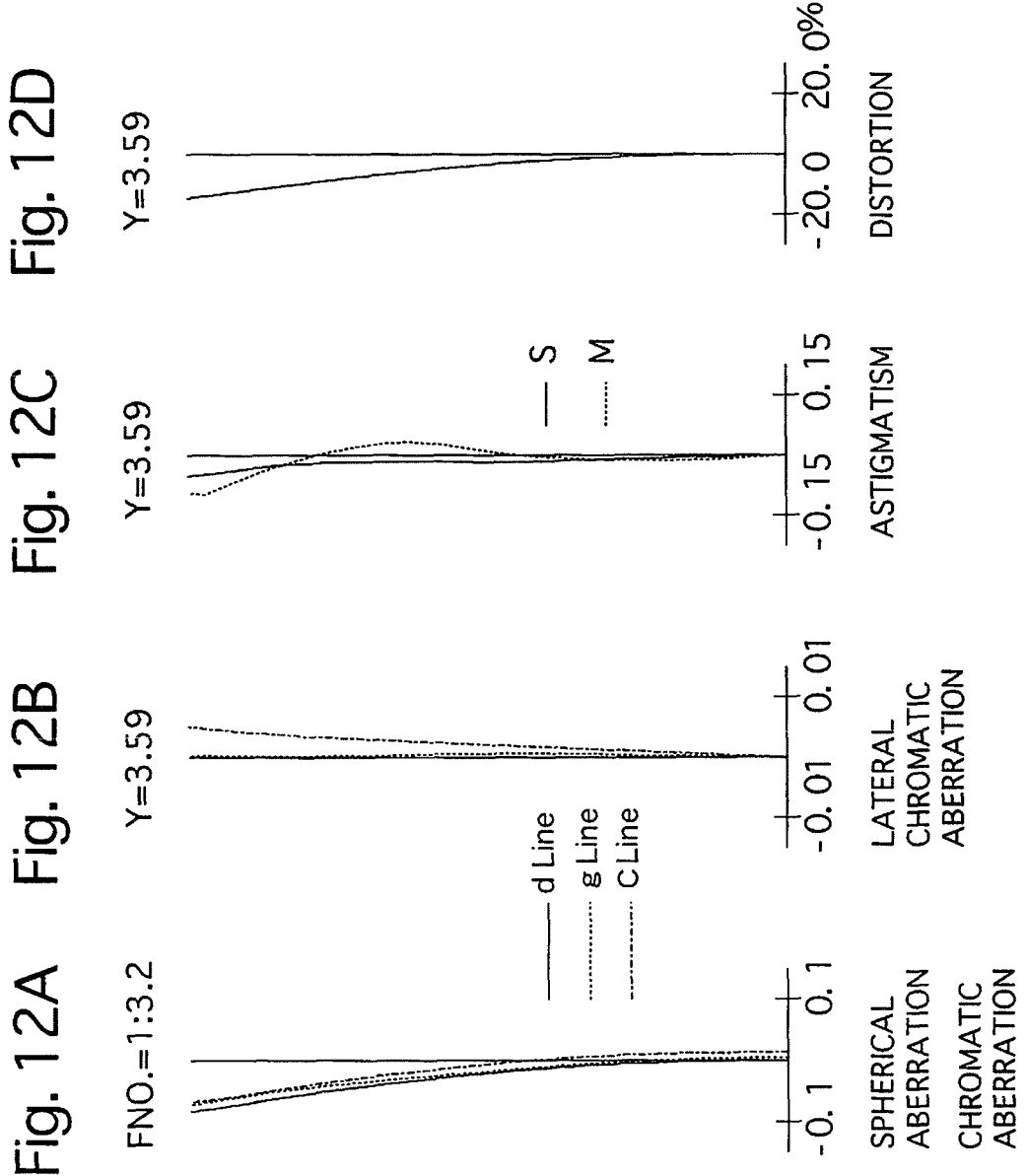
FIGS. 12A, 12B, 12C and 12D show various aberrations that occurred in the lens arrangement shown in FIG. 11.

FIGS. 7 through 12D and Tables 5 through 8 show a second numerical embodiment of a zoom lens system according to the present invention. FIG. 7 shows a lens arrangement of the second numerical embodiment of the zoom lens system at the long focal length extremity when focused on an object at infinity. FIGS. 8A, 8B, 8C and 8D show various aberrations that occurred in the lens arrangement shown in FIG. 7. FIG. 9 shows a lens arrangement of the second numerical embodiment of the zoom lens system at an intermediate focal length when focused on an object at infinity. FIGS. 10A, 10B, 10C and 10D show various aberrations that occurred in the lens arrangement shown in FIG. 9. FIG. 11 shows a lens arrangement of the second numerical embodiment of the zoom lens system at the short focal length extremity when focused on an object at infinity. FIGS. 12A, 12B, 12C and 12D show various aberrations that occurred in the lens arrangement shown in FIG. 11. Table 5 shows the lens surface data, Table 6 shows various zoom lens system data, Table 7 shows the aspherical surface data, and Table 8 shows the lens group data of the zoom lens system according to the second numerical embodiment.

The lens arrangement of the second numerical embodiment is the same as that of the first numerical embodiment except for the following points:

(1) The fourth lens group G4 is configured of a biconvex positive lens element 41 and a negative meniscus lens element 42 having a convex surface on the image side, in that order from the object side. An aspherical surface is formed on each side of the biconvex positive lens element 41. The negative meniscus lens element 42 is provided with an aspherical surface on the object side.

TABLE 5

SURFACE DATA

| Surf. No. | r | d | N (d) | vd |
|---|---|---|---|---|
| 1 | 19.065 | 0.900 | 1.94594 | 18.0 |
| 2 | 15.980 | 0.540 | | |
| 3 | 18.805 | 2.936 | 1.59282 | 68.6 |
| 4 | −301.798 | d4 | | |
| 5 | 339.395 | 0.600 | 1.83481 | 42.7 |
| 6 | 6.038 | 2.030 | | |
| 7 | 178.633 | 0.600 | 1.61800 | 63.4 |
| 8 | 6.667 | 0.100 | | |
| 9* | 5.852 | 1.850 | 1.63550 | 23.6 |
| 10* | 24.116 | d10 | | |
| 11 (Diaphragm) | ∞ | 0.600 | | |
| 12* | 4.770 | 1.950 | 1.55332 | 71.7 |
| 13* | −12.330 | 0.100 | | |

TABLE 5-continued

SURFACE DATA

| Surf. No. | r | d | N (d) | vd |
|---|---|---|---|---|
| 14* | 13.982 | 1.382 | 1.60641 | 27.2 |
| 15* | 4.470 | d15 | | |
| 16* | 22.022 | 2.390 | 1.54358 | 55.7 |
| 17* | −10.105 | 0.070 | | |
| 18* | −9.480 | 0.800 | 1.60641 | 27.2 |
| 19 | −23.628 | d19 | | |
| 20 | ∞ | 0.500 | 1.51633 | 64.1 |
| 21 | ∞ | 0.510 | | |
| 22 | ∞ | 0.500 | 1.51633 | 64.1 |
| 23 | ∞ | — | | |

The asterisk (*) designates an aspherical surface which is rotationally symmetrical with respect to the optical axis.

TABLE 6

ZOOM LENS SYSTEM DATA

Zoom Ratio 9.70

| | Short Focal Length Extremity | Intermediate Focal Length | Long Focal Length Extremity |
|---|---|---|---|
| FNO. | 3.2 | 4.8 | 6.1 |
| f | 5.10 | 16.00 | 49.46 |
| W | 39.5 | 13.8 | 4.5 |
| Y | 3.59 | 3.98 | 3.98 |
| fB | 0.59 | 0.59 | 0.59 |
| L | 39.97 | 51.66 | 63.00 |
| d4 | 0.587 | 11.499 | 22.268 |
| d10 | 12.616 | 5.501 | 1.000 |
| d15 | 3.660 | 12.331 | 18.801 |
| d19 | 4.155 | 3.378 | 1.980 |

TABLE 7

Aspherical Surface Data (the aspherical surface coefficients not indicated are zero (0.00)):

| Surf. No. | K | A4 | A6 | A8 | A10 |
|---|---|---|---|---|---|
| 9 | 0.000 | −0.2790E−03 | −0.3360E−04 | 0.1414E−05 | −0.1056E−06 |
| 10 | 0.000 | −0.3184E−03 | 0.7217E−05 | −0.1672E−05 | |
| 12 | −1.000 | −0.1778E−03 | 0.3709E−04 | −0.2459E−04 | |
| 13 | 0.000 | 0.5357E−04 | −0.3179E−03 | 0.1543E−04 | |
| 14 | 0.000 | 0.1021E−02 | −0.5334E−03 | 0.6297E−04 | |
| 15 | 0.000 | 0.2562E−02 | −0.2612E−03 | 0.6060E−04 | |
| 16 | 0.000 | 0.3629E−03 | −0.5455E−04 | 0.2399E−05 | −0.5113E−07 |
| 17 | 0.000 | 0.6367E−03 | −0.9717E−04 | 0.4576E−05 | −0.7296E−07 |
| 18 | 0.000 | 0.1304E−03 | −0.1043E−04 | 0.7565E−06 | |

TABLE 8

| Lens Group | 1st Surf. | Focal Length |
|---|---|---|
| 1 | 1 | 40.71 |
| 2 | 5 | −6.84 |
| 3 | 12 | 10.08 |
| 4 | 16 | 25.26 |

Numerical Embodiment 3

Figure 13:
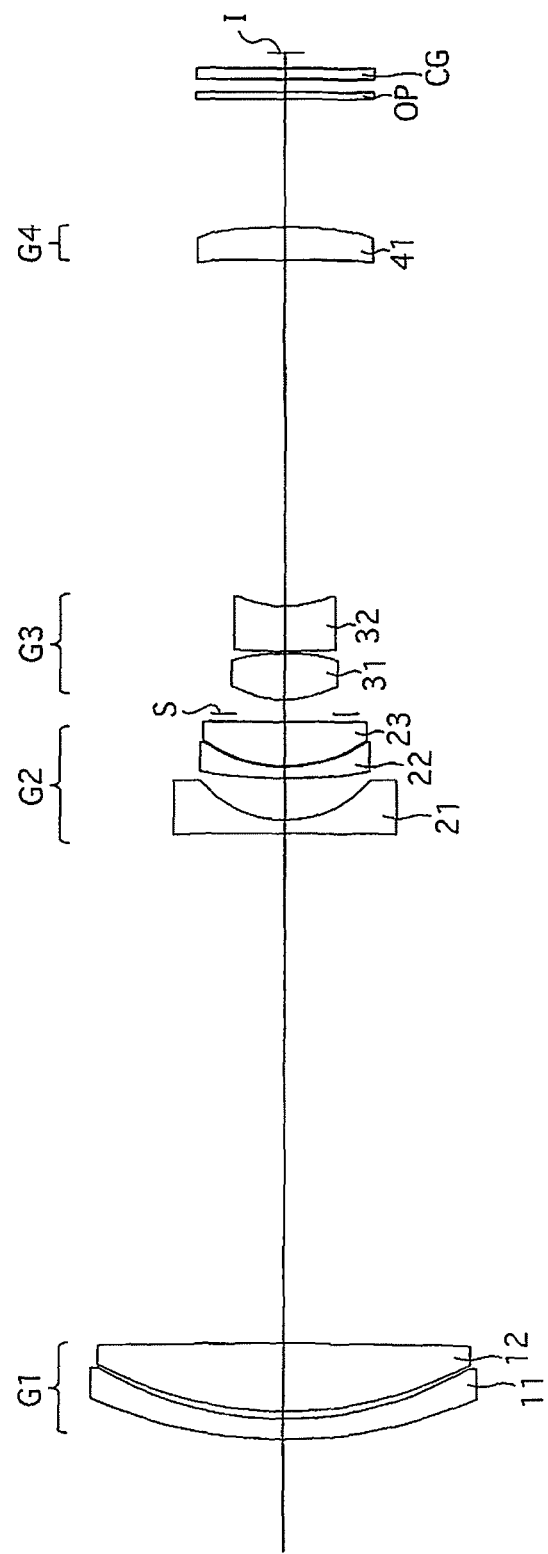
FIG. 13 shows a lens arrangement of a third numerical embodiment of a zoom lens system, according to the present invention, at the long focal length extremity when focused on an object at infinity.
Figure 14:
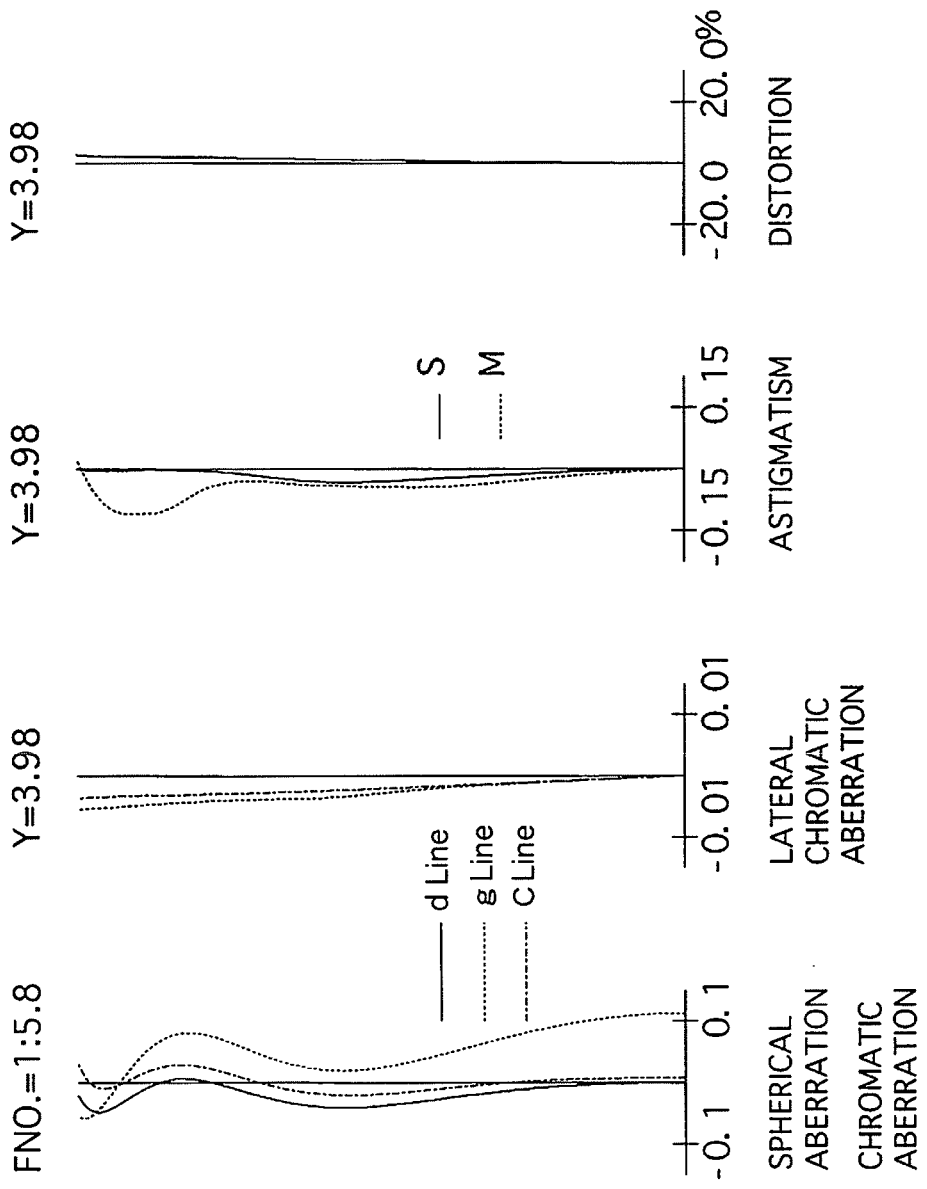
FIGS. 14A, 14B, 14C and 14D show various aberrations that occurred in the lens arrangement shown in FIG. 13.
Figure 15:
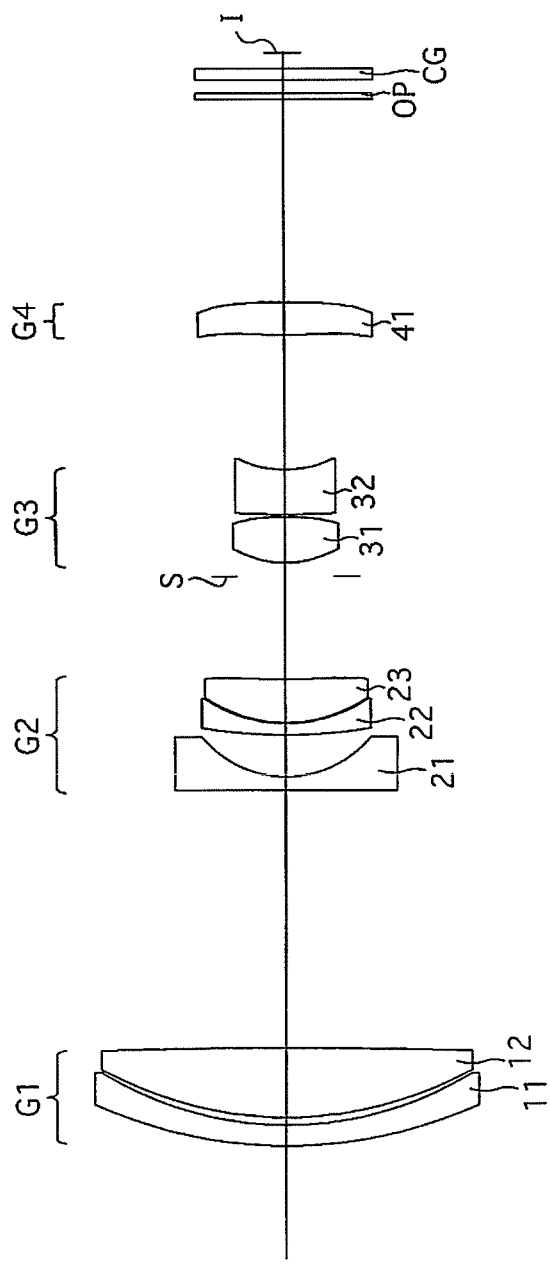
FIG. 15 shows a lens arrangement of the third numerical embodiment of the zoom lens system, according to the present invention, at an intermediate focal length when focused on an object at infinity.
Figure 16:
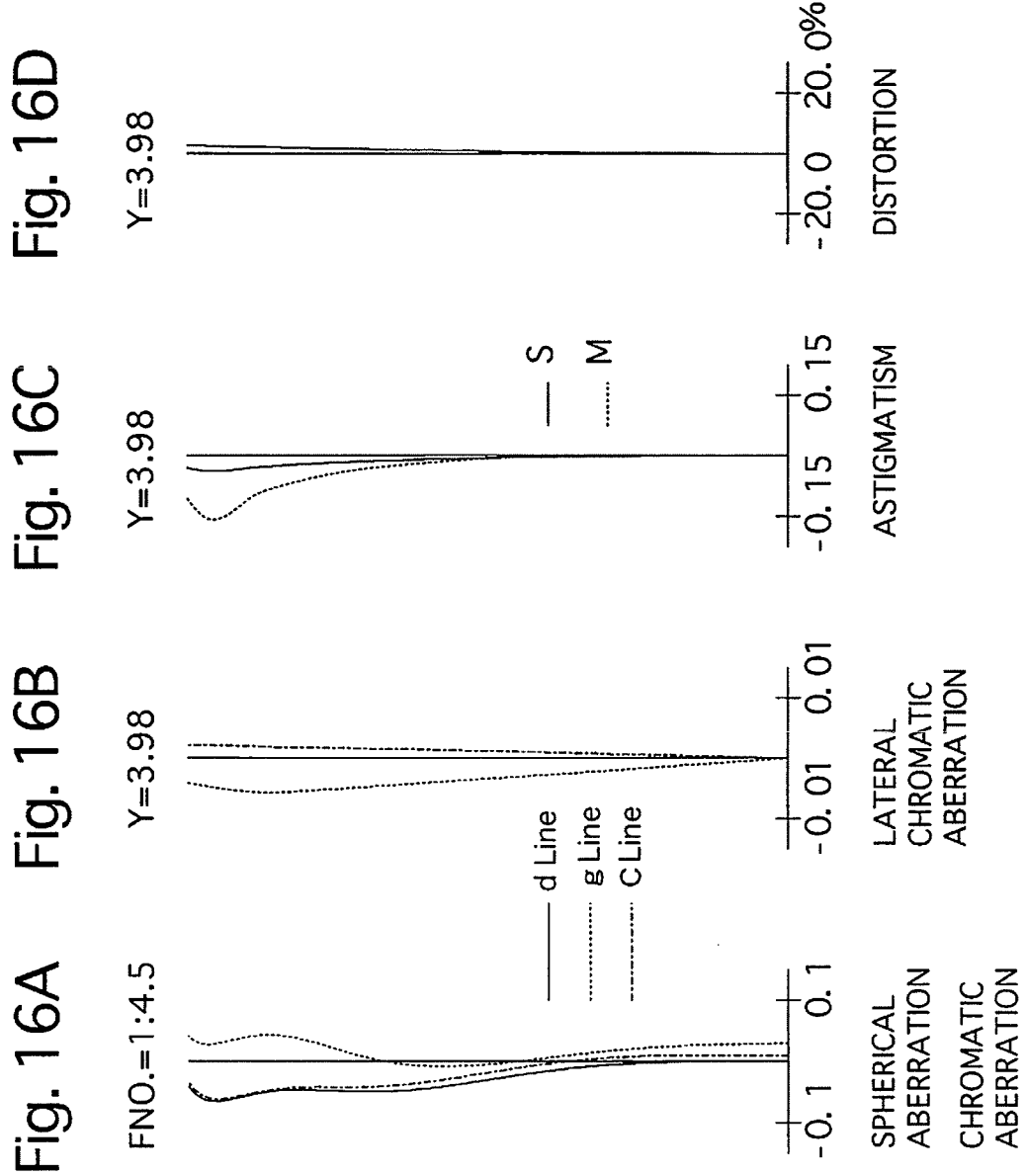
FIGS. 16A, 16B, 16C and 16D show various aberrations that occurred in the lens arrangement shown in FIG. 15.
Figure 17:
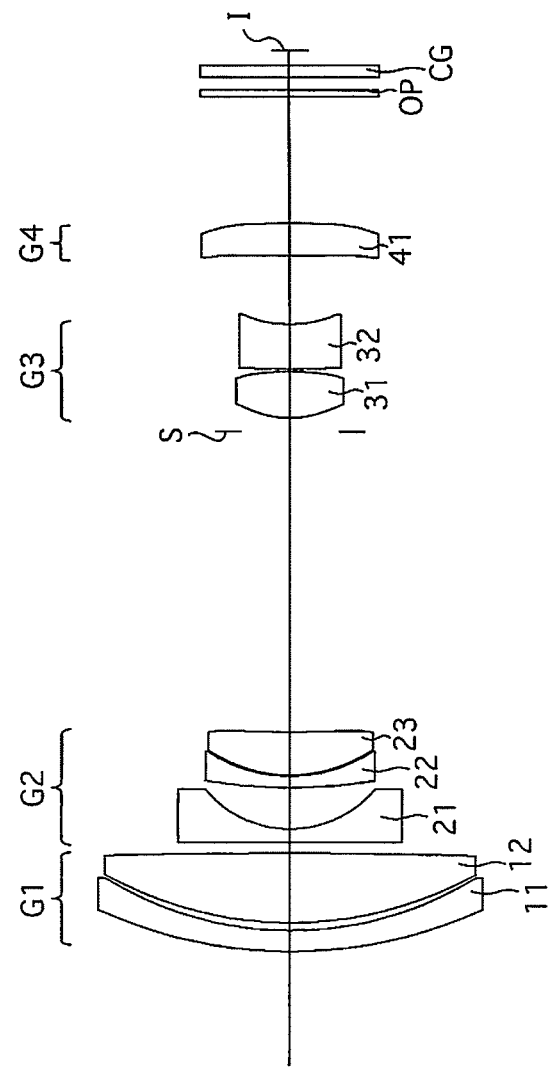
FIG. 17 shows a lens arrangement of the third numerical embodiment of the zoom lens system, according to the present invention, at the short focal length extremity when focused on an object at infinity.
Figure 18:
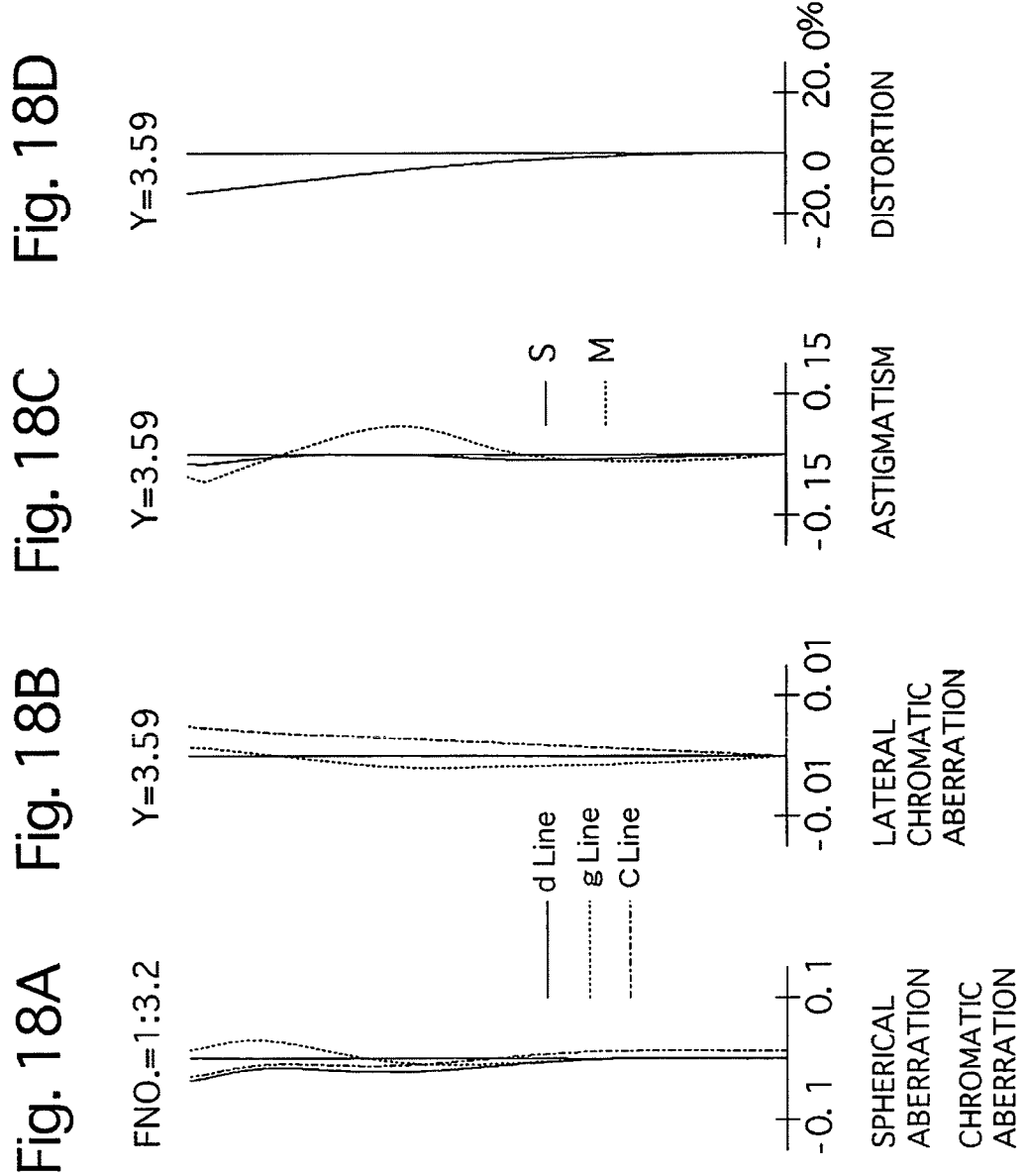
FIGS. 18A, 18B, 18C and 18D show various aberrations that occurred in the lens arrangement shown in FIG. 17.

FIGS. 13 through 18D and Tables 9 through 12 show a third numerical embodiment of a zoom lens system according to the present invention. FIG. 13 shows a lens arrangement of the third numerical embodiment of the zoom lens system at the long focal length extremity when focused on an object at infinity. FIGS. 14A, 14B, 14C and 14D show various aberrations that occurred in the lens arrangement shown in FIG. 13. FIG. 15 shows a lens arrangement of the third numerical embodiment of the zoom lens system at an intermediate focal length when focused on an object at infinity. FIGS. 16A, 16B, 16C and 16D show various aberrations that occurred in the lens arrangement shown in FIG. 15. FIG. 17 shows a lens arrangement of the third numerical embodiment of the zoom lens system at the short focal length extremity when focused on an object at infinity. FIGS. 18A, 18B, 18C and 18D show various aberrations that occurred in the lens arrangement shown in FIG. 17. Table 9 shows the lens surface data, Table 10 shows various zoom lens system data, Table 11 shows the aspherical surface data, and Table 12 shows the lens group data of the zoom lens system according to the third numerical embodiment.

The lens arrangement of the third numerical embodiment is the same as that of the first numerical embodiment except for the following points:
(1) The negative lens element 21 of the second lens group G2 is a biconcave negative lens element.
(2) The positive single lens element 41 of the fourth lens group G4 is a biconvex single positive lens element.

TABLE 9

SURFACE DATA

| Surf. No. | r | d | N (d) | vd |
|---|---|---|---|---|
| 1 | 21.548 | 0.900 | 1.84666 | 23.8 |
| 2 | 16.132 | 0.342 | | |
| 3 | 17.450 | 3.050 | 1.61800 | 63.4 |
| 4 | −307.365 | d4 | | |
| 5 | −1000.000 | 0.600 | 1.83481 | 42.7 |
| 6 | 4.980 | 1.840 | | |
| 7 | 23.421 | 0.500 | 1.61800 | 63.4 |
| 8 | 6.694 | 0.050 | | |
| 9* | 6.463 | 1.900 | 1.63550 | 23.6 |
| 10* | 46.264 | d10 | | |
| 11 (Diaphragm) | ∞ | 0.600 | | |
| 12* | 4.342 | 2.039 | 1.49700 | 81.6 |
| 13* | −11.489 | 0.100 | | |
| 14* | 39.322 | 1.996 | 1.60641 | 27.2 |
| 15* | 6.053 | d15 | | |
| 16* | 40.757 | 1.450 | 1.54358 | 55.7 |
| 17* | −43.271 | d17 | | |
| 18 | ∞ | 0.300 | 1.51680 | 64.2 |
| 19 | ∞ | 0.560 | | |
| 20 | ∞ | 0.500 | 1.51680 | 64.2 |
| 21 | ∞ | — | | |

The asterisk (*) designates an aspherical surface which is rotationally symmetrical with respect to the optical axis.

TABLE 10

ZOOM LENS SYSTEM DATA
Zoom Ratio 9.66

| | Short Focal Length Extremity | Intermediate Focal Length | Long Focal Length Extremity |
|---|---|---|---|
| FNO. | 3.2 | 4.5 | 5.8 |
| f | 5.10 | 16.00 | 49.26 |
| W | 39.1 | 13.6 | 4.5 |
| Y | 3.59 | 3.98 | 3.98 |
| fB | 0.59 | 0.59 | 0.59 |
| L | 39.63 | 48.07 | 61.00 |
| d4 | 0.480 | 11.393 | 22.413 |
| d10 | 13.265 | 4.509 | 0.400 |
| d15 | 3.000 | 5.907 | 15.264 |
| d17 | 5.569 | 8.943 | 5.606 |

TABLE 11

Aspherical Surface Data (the aspherical surface coefficients not indicated are zero (0.00)):

| Surf. No. | K | A4 | A6 | A8 | A10 |
|---|---|---|---|---|---|
| 9 | 0.000 | 0.9047E−05 | −0.6462E−05 | 0.2509E−06 | −0.8033E−07 |
| 10 | 0.000 | −0.5619E−03 | 0.1796E−04 | −0.2750E−05 | |
| 12 | −1.000 | −0.2299E−03 | 0.9657E−04 | −0.4151E−04 | |
| 13 | 0.000 | 0.3297E−03 | −0.5819E−03 | 0.2994E−04 | |
| 14 | 0.000 | 0.1960E−02 | −0.7421E−03 | 0.7999E−04 | |
| 15 | 0.000 | 0.4157E−02 | −0.1705E−03 | 0.6062E−04 | |
| 16 | 0.000 | −0.2828E−03 | −0.1380E−03 | 0.6287E−05 | −0.9165E−07 |
| 17 | 0.000 | −0.2820E−03 | −0.1251E−03 | 0.4788E−05 | −0.4662E−07 |

TABLE 12

LENS GROUP DATA

| Lens Group | 1st Surf. | Focal Length |
|---|---|---|
| 1 | 1 | 40.66 |
| 2 | 5 | −6.88 |
| 3 | 12 | 9.89 |
| 4 | 16 | 38.85 |

Numerical Embodiment 4

Figure 19:
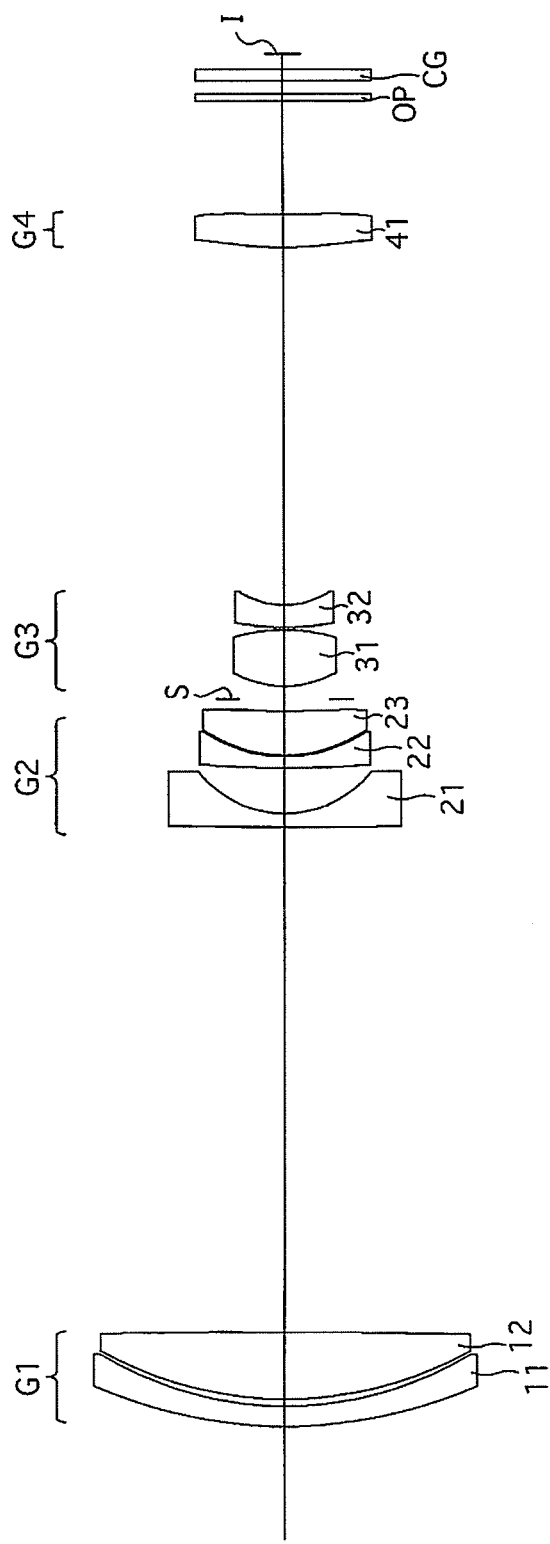
FIG. 19 shows a lens arrangement of a fourth numerical embodiment of a zoom lens system, according to the present invention, at the long focal length extremity when focused on an object at infinity.
Figure 20:
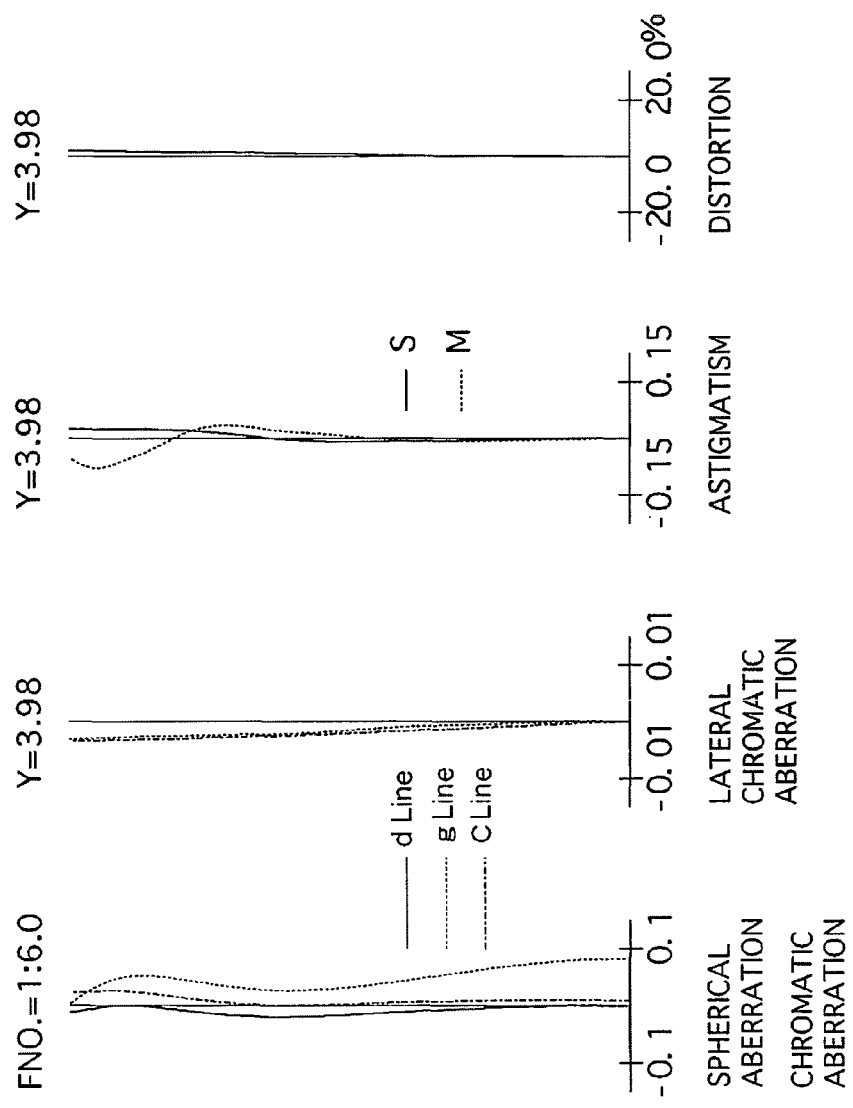
FIGS. 20A, 20B, 20C and 20D show various aberrations that occurred in the lens arrangement shown in FIG. 19.
Figure 21:
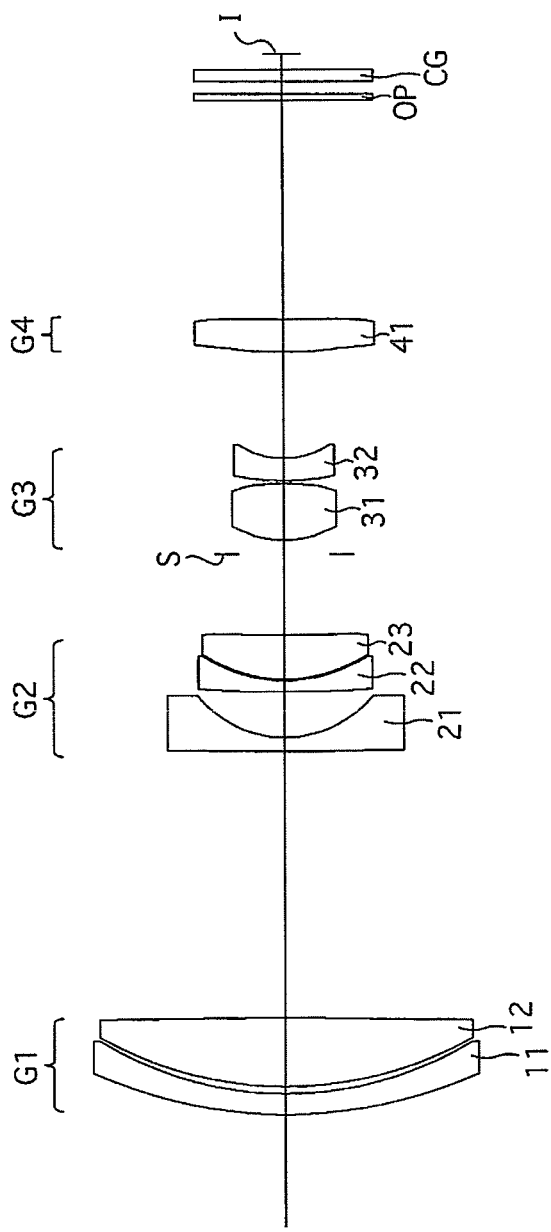
FIG. 21 shows a lens arrangement of the fourth numerical embodiment of the zoom lens system, according to the present invention, at an intermediate focal length when focused on an object at infinity.
Figure 22:
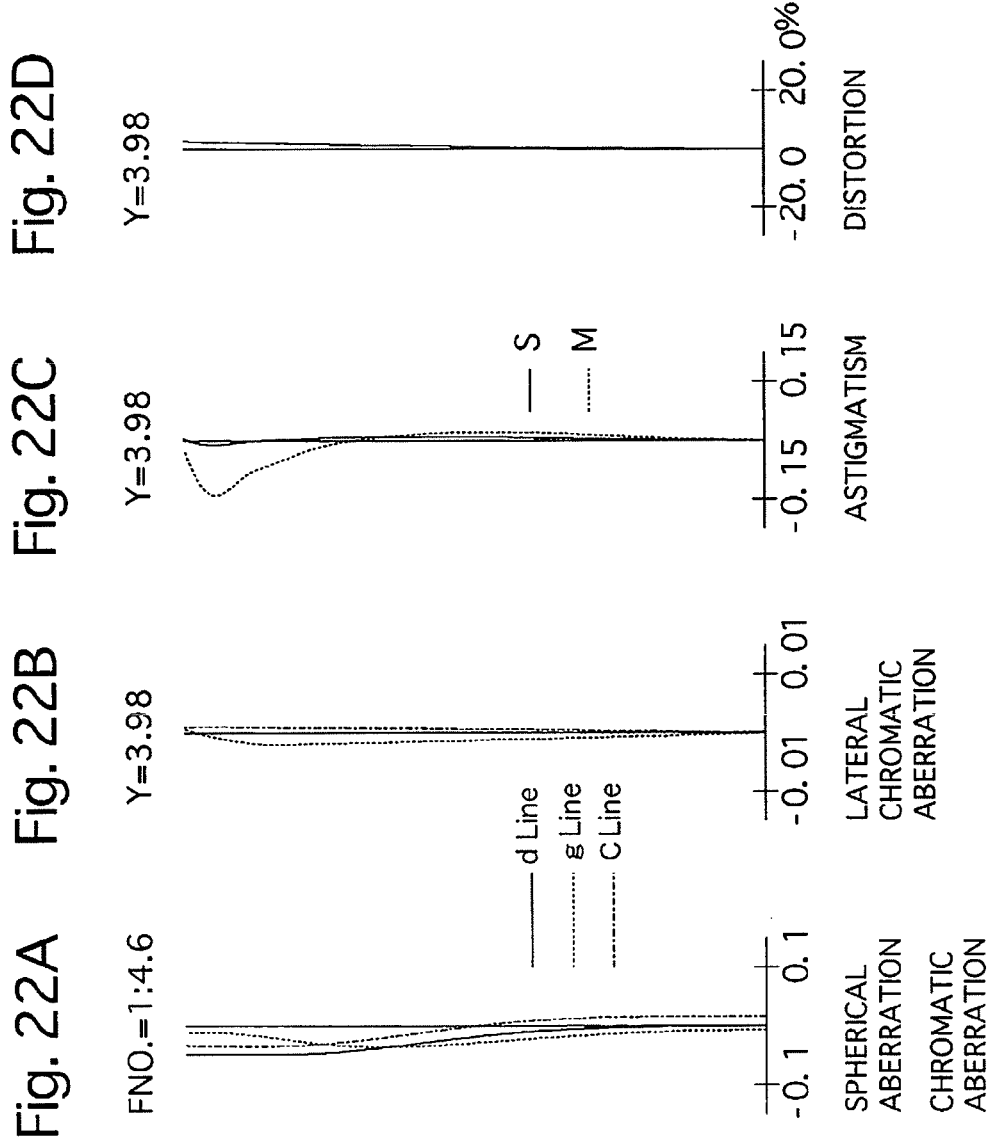
FIGS. 22A, 22B, 22C and 22D show various aberrations that occurred in the lens arrangement shown in FIG. 21.
Figure 23:
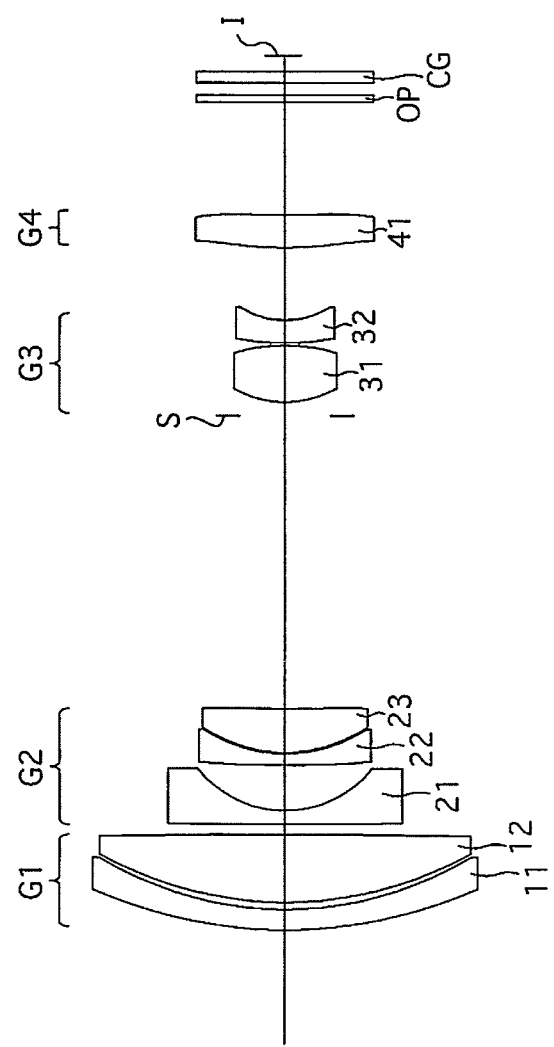
FIG. 23 shows a lens arrangement of the fourth numerical embodiment of the zoom lens system, according to the present invention, at the short focal length extremity when focused on an object at infinity.
Figure 24:
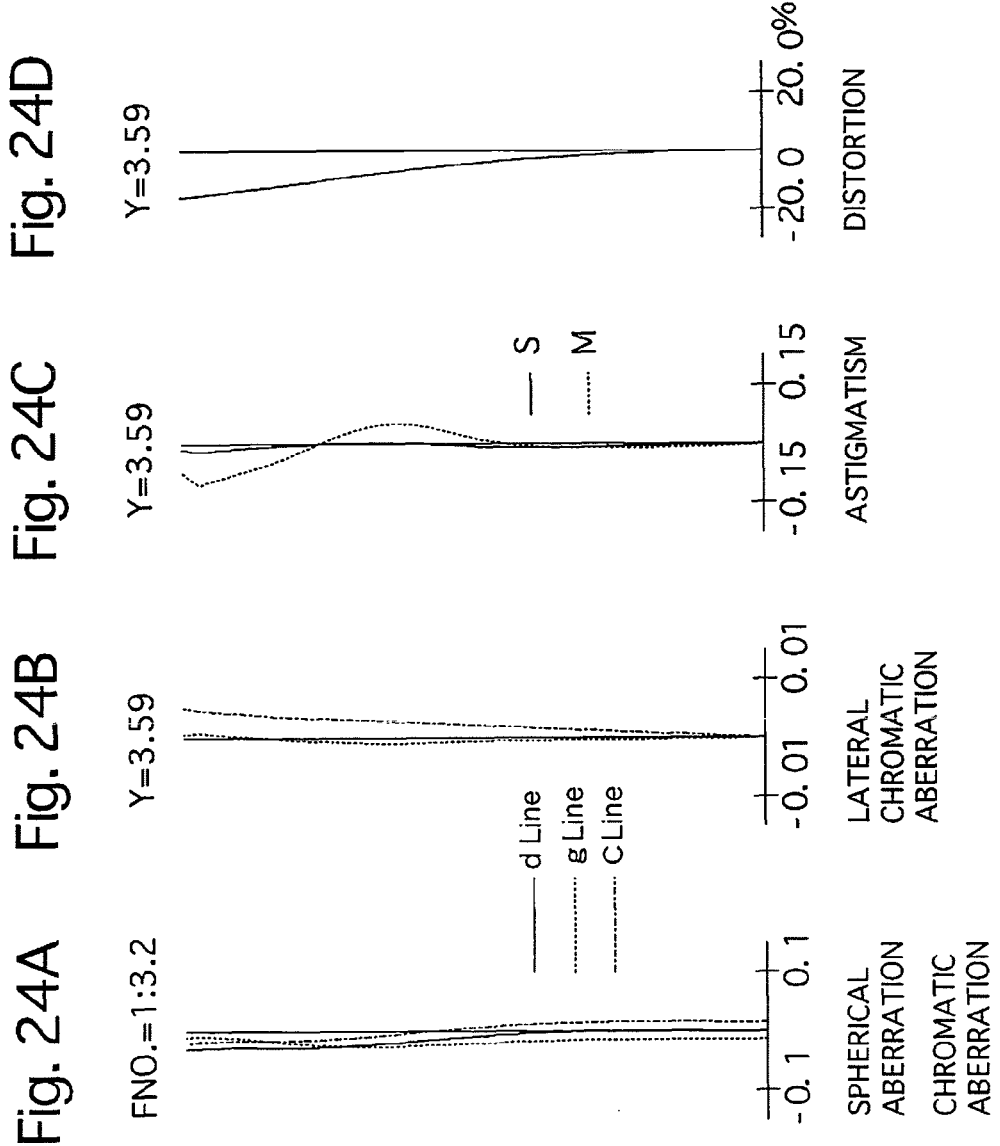
FIGS. 24A, 24B, 24C and 24D show various aberrations that occurred in the lens arrangement shown in FIG. 23.

FIGS. 19 through 24D and Tables 13 through 16 show a fourth numerical embodiment of a zoom lens system according to the present invention. FIG. 19 shows a lens arrangement of the fourth numerical embodiment of the zoom lens system at the long focal length extremity when focused on an object at infinity. FIGS. 20A, 20B, 20C and 20D show various aberrations that occurred in the lens arrangement shown in FIG. 19. FIG. 21 shows a lens arrangement of the fourth numerical embodiment of the zoom lens system at an intermediate focal length when focused on an object at infinity. FIGS. 22A, 22B, 22C and 22D show various aberrations that occurred in the lens arrangement shown in FIG. 21. FIG. 23 shows a lens arrangement of the fourth numerical embodiment of the zoom lens system at the short focal length extremity when focused on an object at infinity. FIGS. 24A, 24B, 24C and 24D show various aberrations that occurred in the lens arrangement shown in FIG. 23. Table 13 shows the lens surface data, Table 14 shows various zoom lens system data, Table 15 shows the aspherical surface data, and Table 16 shows the lens group data of the zoom lens system according to the fourth numerical embodiment.

The lens arrangement of the fourth numerical embodiment is the same as that of the first numerical embodiment.

TABLE 13

SURFACE DATA

| Surf. No. | r | d | N (d) | vd |
|---|---|---|---|---|
| 1 | 21.496 | 0.900 | 1.84666 | 23.8 |
| 2 | 16.112 | 0.320 | | |
| 3 | 17.256 | 2.990 | 1.61800 | 63.4 |
| 4 | −460.464 | d4 | | |
| 5 | 322.444 | 0.600 | 1.83481 | 42.7 |
| 6 | 5.089 | 2.000 | | |
| 7 | 55.730 | 0.500 | 1.61800 | 63.4 |
| 8 | 6.834 | 0.050 | | |
| 9* | 6.191 | 1.940 | 1.63550 | 23.6 |
| 10* | 41.385 | d10 | | |
| 11 (Diaphragm) | ∞ | 0.600 | | |
| 12* | 4.303 | 2.500 | 1.49700 | 81.6 |
| 13* | −9.117 | 0.100 | | |
| 14* | 9.342 | 1.000 | 1.60641 | 27.2 |
| 15* | 3.788 | d15 | | |
| 16* | 17.000 | 1.450 | 1.54358 | 55.7 |
| 17* | 81.604 | d17 | | |
| 18 | ∞ | 0.300 | 1.51680 | 64.2 |
| 19 | ∞ | 0.560 | | |
| 20 | ∞ | 0.500 | 1.51680 | 64.2 |
| 21 | ∞ | — | | |

The asterisk (*) designates an aspherical surface which is rotationally symmetrical with respect to the optical axis.

TABLE 14

ZOOM LENS SYSTEM DATA
Zoom Ratio 9.66

| | Short Focal Length Extremity | Intermediate Focal Length | Long Focal Length Extremity |
|---|---|---|---|
| FNO. | 3.2 | 4.6 | 6.0 |
| f | 4.70 | 16.00 | 45.40 |
| W | 42.2 | 13.6 | 4.9 |
| Y | 3.59 | 3.98 | 3.98 |
| fB | 0.59 | 0.59 | 0.59 |
| L | 38.40 | 46.60 | 60.40 |
| d4 | 0.450 | 11.746 | 22.222 |
| d10 | 12.863 | 3.594 | 0.510 |
| d15 | 3.200 | 4.694 | 15.784 |
| d17 | 4.984 | 9.668 | 4.981 |

TABLE 15

Aspherical Surface Data (the aspherical surface coefficients not indicated are zero (0.00)):

| Surf. No. | K | A4 | A6 | A8 | A10 |
|---|---|---|---|---|---|
| 9 | 0.000 | −0.3395E−03 | −0.1946E−05 | −0.3330E−06 | −0.7559E−07 |
| 10 | 0.000 | −0.6272E−03 | 0.2288E−04 | −0.2829E−05 | |
| 12 | −1.000 | −0.3280E−03 | 0.1099E−03 | −0.3866E−04 | |
| 13 | 0.000 | 0.6816E−04 | −0.4645E−03 | 0.2208E−04 | |
| 14 | 0.000 | 0.2722E−03 | −0.9748E−03 | 0.1127E−03 | |
| 15 | 0.000 | 0.1421E−02 | −0.7549E−03 | 0.1411E−03 | |
| 16 | 0.000 | −0.2669E−06 | −0.1001E−03 | 0.5538E−05 | −0.1129E−06 |
| 17 | 0.000 | −0.7003E−05 | −0.1081E−03 | 0.5394E−05 | −0.9902E−07 |

TABLE 16

LENS GROUP DATA

| Lens Group | 1st Surf. | Focal Length |
|---|---|---|
| 1 | 1 | 41.02 |
| 2 | 5 | −6.57 |
| 3 | 12 | 9.50 |
| 4 | 16 | 39.19 |

The numerical values of each condition for each embodiment are shown in Table 17.

TABLE 17

| | Embod. 1 | Embod. 2 | Embod. 3 | Embod. 4 |
|---|---|---|---|---|
| Cond. (1) | −0.965 | −1.020 | −0.962 | −0.995 |
| Cond. (2) | −6.328 | −5.952 | −5.908 | −6.240 |
| Cond. (3) | 0.241 | 0.399 | 0.255 | 0.243 |
| Cond. (4) | 1.131 | 1.442 | 1.148 | 1.117 |
| Cond. (5) | 81.6 | 71.7 | 81.6 | 81.6 |

As can be understood from Table 17, the first through fourth numerical embodiments satisfy conditions (1) through (5). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, a negative second lens group, a positive third lens group and a positive fourth lens group, in that order from an object side, wherein upon zooming from a short focal length extremity to a long focal length extremity, the distance between said first lens group and said second lens group increases, the distance between said second lens group and said third lens group decreases, and the distance between said third lens group and said fourth lens group changes, wherein said second lens group includes a negative lens element having a concave surface on an image side, a negative lens element having a concave surface on the image side, and a plastic positive lens element having an aspherical surface on at least one side of the plastic positive lens element and having a convex surface on the object side, in that order from the object side, wherein the following condition is satisfied:

$1.0 < z2/z3 < 1.8$, wherein z2=m2t/m2w;

z3=m3t/m3w;

m2t designates the lateral magnification of said second lens group when focused on an object at infinity at the long focal length extremity;

m2w designates the lateral magnification of said second lens group when focused on an object at infinity at the short focal length extremity;

m3t designates the lateral magnification of said third lens group when focused on an object at infinity at the long focal length extremity; and m3w designates the lateral magnification of said third lens group when focused on an object at infinity at the short focal length extremity.

2. The zoom lens system according to claim 1, wherein said third lens group comprises a biconvex positive lens element having an aspherical surface on at least one side of the biconvex positive lens element, and a plastic negative meniscus lens element having a concave surface on the image side, in that order from the object side.

3. The zoom lens system according to claim 2, wherein the following condition is satisfied:

$-1.2 < fa/fb < -0.8$, wherein fa designates the focal length of said plastic positive lens element that is provided within said second lens group; and fb designates the focal length of said plastic negative meniscus lens element provided within said third lens group.

4. The zoom lens system according to claim 1, wherein the following condition is satisfied:

$-7 < f1/f2 < -5.5$, wherein f1 designates the focal length of said first lens group; and f2 designates the focal length of said second lens group.

5. The zoom lens system according to claim 1, wherein the following condition is satisfied:

$0.2 < f3/f4 < 0.5$, wherein f3 designates the focal length of said third lens group; and f4 designates the focal length of said fourth lens group.

6. The zoom lens system according to claim 1, wherein said third lens group comprises a positive lens element having an aspherical surface on each side of the positive lens element, and a negative lens element having an aspherical surface on at least one side of the negative lens element, and having a concave surface on the image side, in that order from the object side, wherein the following condition is satisfied:

$vd > 70$, wherein vd designates the Abbe number with respect to the d-line of the positive lens element provided in said third lens group.

* * * * *